(12) United States Patent
Kim

(10) Patent No.: US 11,023,480 B2
(45) Date of Patent: Jun. 1, 2021

(54) ELECTRONIC DEVICE AND METHOD FOR PROVIDING INFORMATION ON WORK AND PERSONAL LIFE

(71) Applicant: SAMSUNG ELECTRONICS CO., LTD., Suwon-si (KR)

(72) Inventor: Eun-Sun Kim, Namyangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 15/680,553

(22) Filed: Aug. 18, 2017

(65) Prior Publication Data
US 2018/0052896 A1 Feb. 22, 2018

(30) Foreign Application Priority Data

Aug. 19, 2016 (KR) .......................... 10-2016-0105573

(51) Int. Cl.
*G06F 16/248* (2019.01)
*G06F 16/29* (2019.01)
*G06Q 10/10* (2012.01)

(52) U.S. Cl.
CPC ............ *G06F 16/248* (2019.01); *G06F 16/29* (2019.01); *G06Q 10/109* (2013.01)

(58) Field of Classification Search
CPC ...... G06F 16/248; G06F 16/29; G06Q 10/109
See application file for complete search history.

(56) References Cited

U.S. PATENT DOCUMENTS

| 5,006,985 | A | * | 4/1991 | Ehret | ..................... | A61M 21/00 |
| | | | | | | 705/1.1 |
| 6,366,777 | B1 | * | 4/2002 | Uusitalo | ................. | H04W 8/08 |
| | | | | | | 455/432.1 |
| 8,103,309 | B2 | * | 1/2012 | Lee | ................... | H04M 1/72519 |
| | | | | | | 379/433.09 |

(Continued)

FOREIGN PATENT DOCUMENTS

| JP | 2013-105479 | 5/2013 |
| KR | 10-2006-0019320 | 3/2006 |

(Continued)

OTHER PUBLICATIONS

International Search Report dated Nov. 24, 2017 in counterpart International Patent Application No. PCT/KR2017/009056.

(Continued)

*Primary Examiner* — Jorge A Casanova
(74) *Attorney, Agent, or Firm* — Nixon & Vanderhye P.C.

(57) ABSTRACT

A method and an electronic device for providing information associated with work and personal life are provided. An electronic device according to various embodiments may include a user interface, a processor electrically connected to the user interface, and a memory electrically connected to the processor. The memory stores instructions which when executed by the processor cause the processor to determine a first zone and a second zone different from the first zone, based on location information and time information of the electronic device, obtain a first time during which the electronic device is located in the first zone and a second time during which the electronic device is located in the second zone, and display information associated with the first time and the second time on the user interface.

18 Claims, 18 Drawing Sheets

(56) References Cited

U.S. PATENT DOCUMENTS

| | | | |
|---|---|---|---|
| 8,180,400 B2* | 5/2012 | Shin | H04M 1/72519 455/435.2 |
| 8,588,749 B1* | 11/2013 | Sadhvani | H04M 1/24 379/1.01 |
| 9,378,467 B1* | 6/2016 | Chaiyochlarb | G06N 5/047 |
| 2009/0061932 A1* | 3/2009 | Nagarajan | H04M 1/72519 455/558 |
| 2009/0170507 A1* | 7/2009 | Kim | H04W 60/02 455/433 |
| 2011/0081951 A1* | 4/2011 | Hwang | H04W 8/183 455/558 |
| 2012/0065932 A1 | 3/2012 | Cahoon, Jr. et al. | |
| 2012/0154413 A1* | 6/2012 | Kim | H04M 1/72563 345/530 |
| 2013/0281085 A1* | 10/2013 | Sen | H04W 48/18 455/426.1 |
| 2014/0080502 A1 | 3/2014 | Chiang et al. | |
| 2014/0310366 A1 | 10/2014 | Fu et al. | |
| 2015/0345942 A1 | 12/2015 | Allocco et al. | |
| 2015/0350456 A1* | 12/2015 | Chan | H04M 15/715 455/407 |
| 2016/0042308 A1 | 2/2016 | Aptakin | |
| 2016/0125344 A1* | 5/2016 | Carmeli | G06Q 10/06393 705/7.39 |
| 2016/0350505 A1 | 12/2016 | Cho | |

FOREIGN PATENT DOCUMENTS

| | | |
|---|---|---|
| KR | 10-1037854 | 5/2011 |
| KR | 10-2015-0001031 | 1/2015 |
| KR | 10-1560760 | 10/2015 |
| WO | 2011/050248 | 4/2011 |
| WO | 2015/009915 | 1/2015 |

OTHER PUBLICATIONS

Extended Search Report dated Apr. 12, 2019 in counterpart European Patent Application No. 17841728.3.

* cited by examiner

Total
Work: 8hrs / Life time :8hrs 30mins / Sleep time : 7hrs 30mins

Total
Work: 0hrs / Life time :13hrs 30mins / Sleep time : 10hrs 30mins

Total
Work: 12hrs 30mins/ Life time :5hrs / Sleep time : 6hrs 30mins

Total
Work: 10hrs / Life time :7hrs 30mins / Sleep time : 6hrs30mins

ELECTRONIC DEVICE AND METHOD FOR PROVIDING INFORMATION ON WORK AND PERSONAL LIFE

CROSS-REFERENCE TO RELATED APPLICATION

This application is based on and claims priority under 35 U.S.C. § 119 to Korean Application Serial No. 10-2016-0105573, which was filed in the Korean Intellectual Property Office on Aug. 19, 2016, the content of which is incorporated by reference herein in its entirety.

TECHNICAL FIELD

The present disclosure relates generally to a method and apparatus for providing information associated with work and personal life.

BACKGROUND

As the performance of electronic devices (e.g., smart phones) has improved, various services that prevent and/or reduce interference between work and personal life have been provided to users. The various services may include a service that combines and uses two SIM cards in a single portable terminal, a service that uses two user accounts, and a service that uses two telephone numbers. The services may separate a work environment, such as calling or messaging persons related to work, using work-related applications, or the like, from a personal life environment, such as calling or messaging persons related to personal life, using personal-life-related applications, or the like.

Recently, information associated with whether a user has a balanced life between work and personal life has been required.

SUMMARY

Various example embodiments may provide an electronic device and a method for providing a user with an index indicating whether the user has a balanced life between work and personal life.

Various example embodiments may provide an electronic device and a method for providing information associated with work and personal life.

According to various example embodiments, an electronic device is provided, the electronic device, including: a user interface; a processor electrically connected to the user interface; and a memory electrically connected to the processor, wherein, the memory stores instructions which, when executed by the processor, cause the electronic device to perform operations including: determining a first zone and a second zone different from the first zone, based on location information and time information of the electronic device, obtaining a first time during which the electronic device is located in the first zone and a second time during which the electronic device is located in the second zone, and displaying information associated with the first time and the second time on the user interface.

According to various example embodiments, a storage medium storing instructions is provided, wherein the instructions, when executed by a processor cause the processor to perform at least one operation, the at least one operation including: determining a first zone and a second zone different from the first zone, based on location information and time information of an electronic device; obtaining a first time during which the electronic device is located in the first zone and a second time during which the electronic device is located in the second zone; and displaying information associated with the first time and the second time on a user interface.

According to various example embodiments, a method of operating an electronic device is provided, the method including: determining a first zone and a second zone different from the first zone, based on location information and time information of the electronic device; obtaining a first time during which the electronic device is located in the first zone and a second time during which the electronic device is located in the second zone; and displaying information associated with the first time and the second time on a user interface.

According to various example embodiments, the present disclosure provides a user with an index indicating whether the user has a balanced life between work and personal life, thereby enabling the user to enhance his/her life with insight into his/her life.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
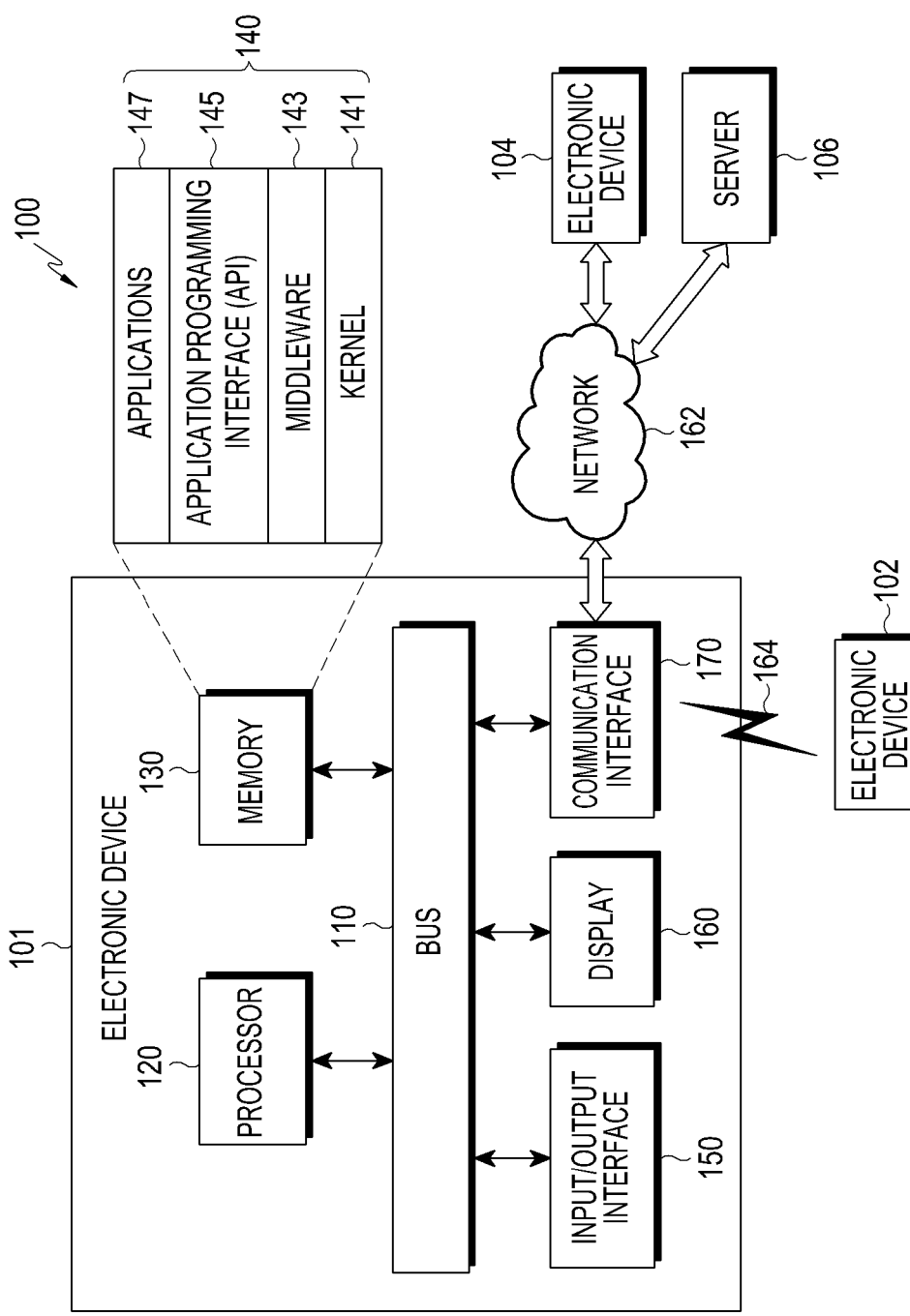
FIG. 1 is a diagram illustrating an example network environment including an electronic device, according to various example embodiments.

Hereinafter, various example embodiments of the present disclosure will be described with reference to the accompanying drawings. The example embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements.

A singular expression may include a plural expression unless they are definitely different in a context. In the present disclosure, the expression "A or B", "at least one of A and/or B", or "A/B" may include all possible combinations of the items listed.

The expression "a first", "a second", "the first", or "the second" used in various embodiments of the present disclosure may modify various components regardless of the order and/or the importance but does not limit the corresponding components.

When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may refer to a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like), or the like, but is not limited thereto.

In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An example electronic device 101 in a network environment 100 according to various example embodiments will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. In some embodiments, the electronic device 101 may omit at least one of the elements, or may further include other elements.

The bus 110 may include, for example, a circuit that interconnects the elements 110 to 170 and delivers communication (e.g., control messages and/or data) between the elements.

The processor 120 may include various processing circuitry, such as, for example, and without limitation, one or more of a dedicated processor, a central processing unit, an application processor, and a communication processor (CP). The processor 120, for example, may carry out operations or data processing relating to the control and/or communication of at least one other element of the electronic device 101.

Figure 4:
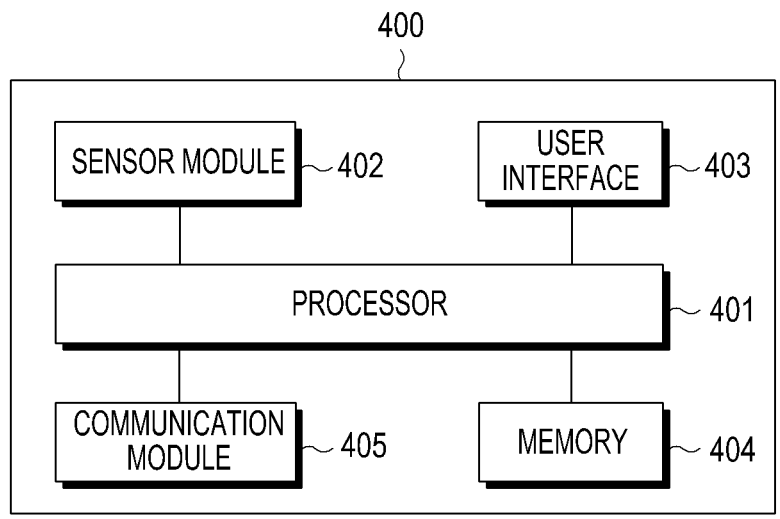
FIG. 4 is a block diagram illustrating an example electronic device according to various example embodiments.

According to an embodiment, the processor 120 may obtain location information (e.g., GPS information, cell information, base station information, and the like) and time information (e.g., a time during which the electronic device 101 is located at a predetermined location) associated with the electronic device 101, and may determine a first zone (e.g., a work zone such as an office) and a second zone (e.g., a personal life zone such as a home), which is different from the first zone, based on the obtained location information and time information. With reference to FIG. 4, which will be discussed in greater detail below, a processor 401 may obtain a first time (e.g., a work time) during which an electronic device 400 is located in the first zone and a second time (e.g., a personal life time) during which the electronic device 400 is located in the second zone, and displays information associated with the obtained first time and second time on the display 160.

According to various embodiments, the processor 120 may obtain a third time (e.g., a sleep time) indicating a time during which a user sleeps, in addition to the work time and the personal life time, and may display information associated with the obtained first time, second time, and third time on the display 160.

The memory 130 may include a volatile and/or non-volatile memory. The memory 130 may store, for example, instructions or data relevant to at least one other element of the electronic device 101.

According to an embodiment, the memory 130 may store software and/or a program 140. The program 140 may include, for example, a kernel 141, middleware 143, an application programming interface (API) 145, and/or application programs (or "applications") 147. At least a part of the kernel 141, the middleware 143, or the API 145 may be referred to as an operating system.

The kernel 141 may control or manage system resources (e.g., the bus 110, the processor 120, or the memory 130) used for executing an operation or function implemented by other programs (e.g., the middleware 143, the API 145, or the applications 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities to use the system resources (e.g., the bus 110, the processor 120, the memory 130, or the like) of the electronic device 101 to at least one of the application programs 147, and may process the one or more task requests. The API 145 is an interface used by the application 147 to control a function provided from the kernel 141 or the middleware 143, and may include, for example, at least one interface or function (e.g., an instruction) for file control, window control, image processing, character control, or the like.

For example, the input/output interface 150 may include various input/output circuitry and forward instructions or data, input from a user or an external device, to other element(s) of the electronic device 101, or may output instructions or data, received from the other element(s) of the electronic device 101, to the user or the external device.

The display 160 may include, for example, a Liquid Crystal Display (LCD), a Light-Emitting Diode (LED) display, an Organic Light-Emitting Diode (OLED) display, a Micro Electro Mechanical System (MEMS) display, or an electronic paper display, or the like, but is not limited thereto. The display 160 may display, for example, various types of content (e.g., text, images, videos, icons, and/or symbols) to a user. The display 160 may include a touchscreen, and may receive, for example, a touch, gesture, proximity, drag, swipe, or hovering input using an electronic pen or a user's body part.

The communication interface 170 may include various communication circuitry and configure communication, for example, between the electronic device 101 and an external device (e.g., a first external electronic device 102, a second external electronic device 104, or a server 106). For example, the communication interface 170 may be connected to a network 162 through wireless or wired communication to communicate with an external device (e.g., the second external electronic device 104 or the server 106). Additionally, the communication interface 170 may establish a short-range wireless communication connection 164 with another electronic device (e.g., first external electronic device 102).

The wireless communication may include, for example, cellular communication that uses at least one of LTE, LTE-Advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi, Bluetooth, Bluetooth Low Energy (BLE), ZigBee, near field communication (NFC), magnetic secure transmission, Radio Frequency (RF), and body area network (BAN). According to an embodiment, the wireless communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a universal serial bus (USB), a high definition multimedia interface (HDMI), recommended standard 232 (RS-232), and a plain old telephone service (POTS). The network 162 may include a telecommunications network, for example, at least one of a computer network (e.g., a LAN or a WAN), the Internet, and a telephone network.

Each of the first and second external electronic devices 102 and 104 may be of a type the same as or different from the electronic device 101.

According to various embodiments, all or some of the operations performed by the electronic device 101 may be performed by another electronic device or a plurality of electronic devices (e.g., the electronic device 102 or 104, or the server 106).

According to an embodiment, when the electronic device 101 has to perform a function or service automatically or upon request, the electronic device 101 may request another device (e.g., the electronic device 102 or 104, or the server 106) to perform at least some functions relating thereto, instead of autonomously performing the function or service, or additionally performing the function or service. Another electronic device (e.g., the electronic device 102 or 104, or the server 106) may execute the requested functions or the additional functions, and may deliver the result of execution to the electronic device 101. The electronic device 101 may process the received result as it is or may additionally process the received result, to provide the requested functions or services. To this end, for example, cloud computing, distributed computing, or client-server computing technology may be used.

Figure 2:
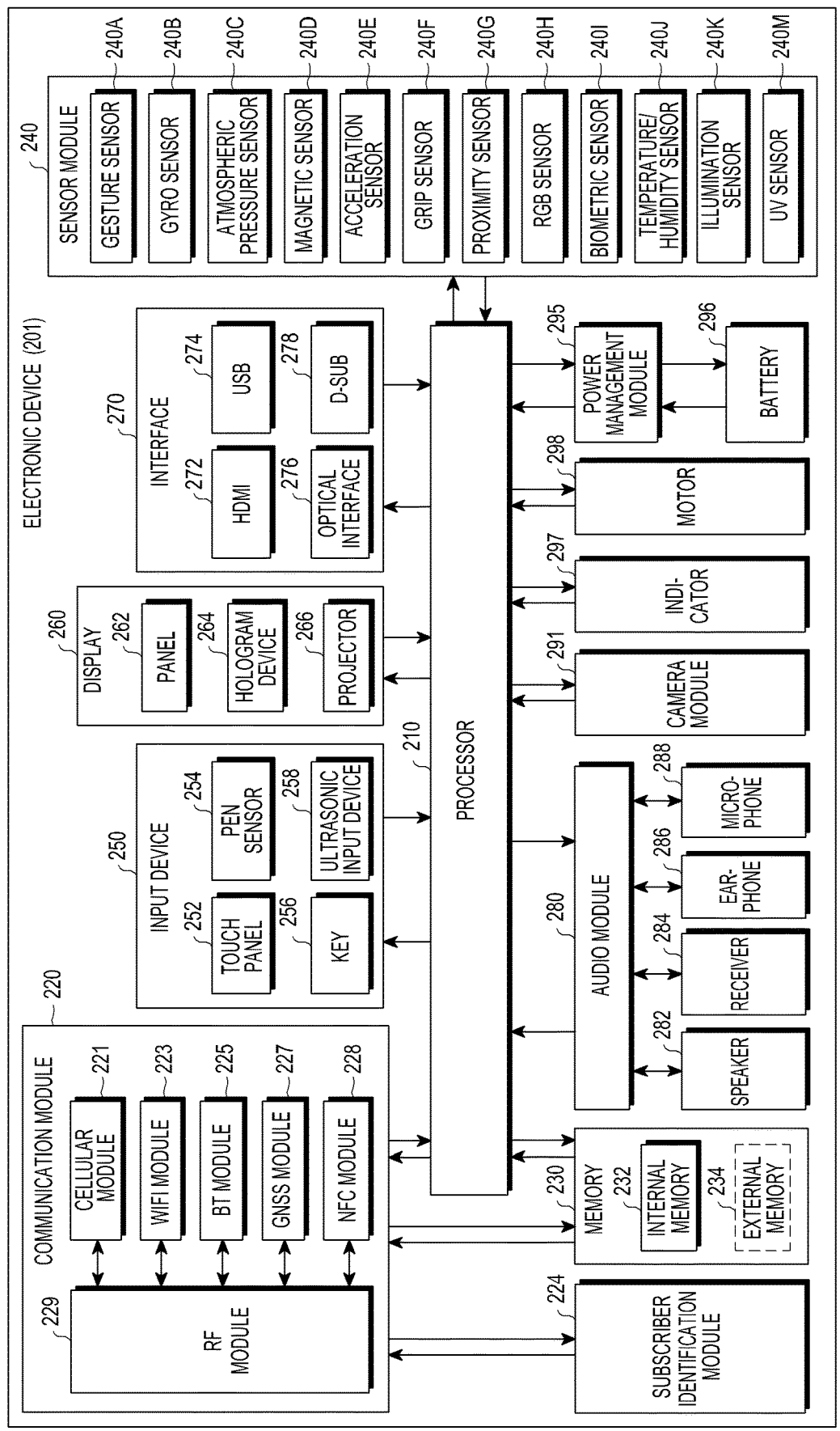
FIG. 2 is a block diagram illustrating an example electronic device according to various example embodiments.

FIG. 2 is a block diagram illustrating an example electronic device 201 according to various example embodiments. The electronic device 201 may include, for example, the whole or a part of the electronic device 101 illustrated in FIG. 1.

The electronic device 201 may include at least one processor (e.g., including processing circuitry) 210 (e.g., an AP), a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control a plurality of hardware or software elements connected thereto and may perform various data processing and operations by driving an operating system or an application program. The processor 210 may be embodied, for example, as a System on Chip (SoC).

According to an embodiment, the processor 210 may further include a Graphic Processing Unit (GPU) and/or an image signal processor. The processor 210 may include at least some of the elements illustrated in FIG. 2 (e.g., a cellular module 221). The processor 210 may load, in a volatile memory, instructions or data received from at least one of the other elements (e.g., a non-volatile memory), process the loaded instructions or data, and store resultant data in the non-volatile memory.

According to an embodiment, the processor 210 may obtain location information (e.g., GPS information, cell information, base station information, and the like) and time information (e.g., a time during which an electronic device is located at a predetermined location), and may determine a first zone (e.g., a work zone such as an office) and a second zone (e.g., a personal life zone such as a home), which is different from the first zone, based on the obtained location information and time information. With reference to FIG. 4, which will be discussed in greater detail below, processor 401 obtains a first time (e.g., a work time) during which the electronic device 400 is located in the first zone and a second time (e.g., a personal life time) during which the electronic device 400 is located in the second zone, and displays information associated with the obtained first time and second time on a display 260. According to various embodiments, the processor 210 may obtain a third time (e.g., a sleep time) indicating a time during which a user sleeps, in addition to the work time and the personal life time, and may display information associated with the obtained first time, second time, and third time on the display 260.

The communication module 220 may have a configuration that is the same as, or similar to, that of the communication interface 170. The communication module 220 may include various communication circuitry, such as, for example, and without limitation, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment of the present disclosure, the cellular module 221 may identify or authenticate an electronic device 201 in the communication network by using the subscriber identification module (e.g., a Subscriber Identity Module (SIM) card) 224. According to an embodiment, the cellular module 221 may perform at least some of the functions that the AP 210 may provide. According to an embodiment, the cellular module 221 may include a communication processor (CP). In some embodiments, at least some (two or more) out of the cellular module 221, the Wi-Fi module 223, the Bluetooth module 225, the GNSS module 227, and the NFC module 228 may be included in a single Integrated Chip (IC) or IC package. The RF module 229, for example, may transmit/receive a communication signal (e.g., an RF signal). The RF module 229 may include, for example, a transceiver, a power amp module (PAM), a frequency filter, a low noise amplifier (LNA), an antenna, or the like. According to another embodiment, at least one of the cellular module 221, the Wi-Fi module 223, the Bluetooth module 225, the GNSS module 227, and the NFC module 228 may transmit/receive an RF signal through a separate RF module.

The subscriber identification module 224 may include, for example, a card that includes a subscriber identification module, or an embedded SIM, and may contain unique identification information (e.g., an integrated circuit card identifier (ICCID)) or subscriber information (e.g., international mobile subscriber identity (IMSI)).

The memory 230 (e.g., the memory 130) may include, for example, an embedded memory 232 and/or an external memory 234. The embedded memory 232 may include, for example, at least one of a volatile memory (e.g., a DRAM, an SRAM, an SDRAM, or the like) and a non-volatile memory (e.g., a one-time programmable ROM (OTPROM), a PROM, an EPROM, an EEPROM, a mask ROM, a flash ROM, a flash memory, a hard disc drive, or a solid state drive (SSD)). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally and/or physically connected to the electronic device 201 through various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240, while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (e.g., a microphone 288) to identify data corresponding to the detected ultrasonic waves.

The display 260 (e.g., the display 160) may include a panel 262, a hologram device 264, a projector 266, and/or a control circuit for controlling them. The panel 262 may be implemented to be, for example, flexible, transparent, or wearable. The panel 262 may include the touch panel 252 and one or more modules. According to an embodiment, the panel 262 may include a pressure sensor (or force sensor) which may measure the strength of pressure of a user's touch. The pressure sensor may be embodied as an entity integrated with the touch panel 252 or may be embodied as one or more sensors separated from the touch panel 252. The hologram device 264 may show a three dimensional image in the air using light interference. The projector 266 may display an image by projecting light onto a screen. The screen may be located, for example, in the interior of, or on the exterior of, the electronic device 201.

The interface 270 may include various interface circuitry, such as, for example, and without limitation, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280, for example, may convert a sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like.

The camera module 291 is a device that can photograph a still image and a moving image. According to an embodiment, the camera module 291 may include one or more image sensors (e.g., a front sensor or a rear sensor), a lens, an image signal processor (ISP), or a flash (e.g., an LED or xenon lamp).

The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. The wireless charging method may include a magnetic resonance method, a magnetic induction method, an electromagnetic wave method, and the like. Additional circuits (e.g., a coil loop, a resonance circuit, a rectifier, and the like) for wireless charging may be further included. The battery gauge may measure, for example, the remaining amount of a charge of the battery 296 and a voltage, current, or temperature while charging. The battery 296 may include, for example, a rechargeable battery and/or a solar battery.

The indicator 297 may indicate a particular state (e.g., a booting state, a message state, a charging state, and the like) of the electronic device 201 or a part (e.g., the processor 210) thereof. The motor 298 may convert an electrical signal into a mechanical vibration and may generate a vibration, haptic effect, or the like. The electronic device 201 may include a mobile TV support device that can process media data according to a standard, such as digital multimedia broadcasting (DMB), digital video broadcasting (DVB), mediaFlo™, and the like. Each of the above-described component elements of hardware according to the present disclosure may be configured with one or more components, and the names of the corresponding component elements may vary based on the type of electronic device. According to various embodiments, the electronic device (e.g., the electronic device 201) does not include some elements or further include additional elements. Some of elements are coupled to constitute one object but the electronic device may perform the same functions as those which the corresponding elements have before being coupled to each other.

Figure 3:
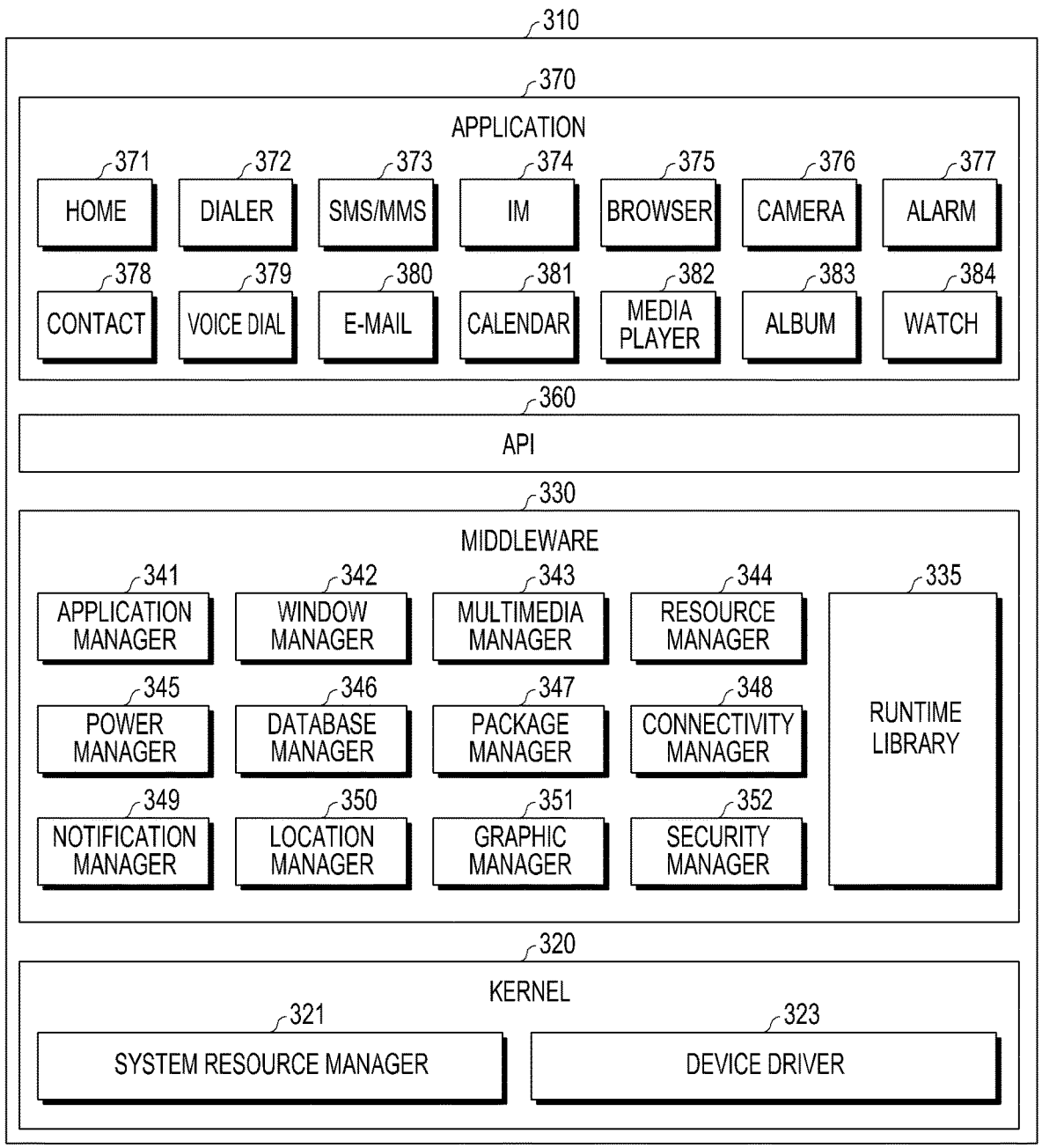
FIG. 3 is a block diagram illustrating an example programming module according to various example embodiments.

FIG. 3 is a block diagram illustrating an example program module according to various embodiments. According to an embodiment, a program module 310 (e.g., the program 140) may include an operating system for controlling resources related to an electronic device (e.g., the electronic device 101) and/or various applications (e.g., the application programs 147) executed in the operating system. The operating system may include, for example, Android™, iOS™, Windows™, Symbian™, Tizen™, or Bada™.

Referring to FIG. 3, the program module 310 may include a kernel 320 (e.g., the kernel 141), middleware 330 (e.g., the middleware 143), an API 360 (e.g., the API 145), and/or applications 370 (e.g., the application programs 147). At least a part of the program module 310 may be preloaded on the electronic device, or may be downloaded from an external electronic device (e.g., the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for a corresponding format. The resource manager 344 may manage the source code of the applications 370 or space in memory. The power manager 345 may manage, for example, the capacity or power of a battery and may provide power information required for operating the electronic device. According to an embodiment, the power manager 345 may interoperate with a Basic Input/Output System (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide an event (e.g., an arrival message, an appointment, a proximity notification, and the like) to a user. The location manager 350 may manage, for example, the location information of the electronic device. The graphic manager 351 may manage graphic effects to be provided to a user and a user interface relating to the graphic effects. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide a module specialized for each type of operating system. Furthermore, the middleware 330 may dynamically remove some of the existing elements, or may add new elements. The API 360 is, for example, a set of API programming functions, and may be provided in different configurations according to operating systems. For example, one API set may be provided for each platform in the case of Android or iOS, and two or more API sets may be provided for each platform in the case of Tizen.

The applications 370 may include applications that provide, for example, a home 371, a dialer 372, an SMS/MMS 373, an instant message (IM) 374, a browser 375, a camera 376, an alarm 377, contacts 378, a voice dial 379, an e-mail 380, a calendar 381, a media player 382, an album 383, a watch 384. Additionally, though not shown, the applications 370 may include applications relating to health care (e.g., measuring exercise quantity or blood glucose), environment information (e.g., atmospheric pressure, humidity, or temperature information), and the like. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may install, delete, or update functions of an external electronic device that communicates with the electronic device (e.g., turning on/off the external electronic device itself (or some elements thereof) or adjusting the brightness (or resolution) of a display) or applications executed in the external electronic device. According to an embodiment, the applications 370 may include applications (e.g., a health care application of a mobile medical appliance) that are designated according to the attributes of an external electronic device. According to an embodiment, the applications 370 may include applications received from an external electronic device. At least some of the program module 310 may be embodied (e.g., executed) by software, firmware, hardware (e.g., the processor 210), or a combination of two or more thereof, and may include a module, a program, a routine, an instruction set, or a process for performing one or more functions.

FIG. 4 is a block diagram illustrating an example electronic device according to various example embodiments of the present disclosure.

Referring to FIG. 4, the electronic device 400 may include a processor (e.g., including processing circuitry) 401, a sensor module 402, a user interface (e.g., the display 160 of the FIG. 1 or the display 260 of the FIG. 2) 403, a memory 404, and a communication module (e.g., including communication circuitry) 405.

According to an embodiment, the processor 401 may include various processing circuitry and obtain location information (e.g., GPS information, cell information, base station information, and the like) and time information (e.g., a time during which the electronic device 400 is located at a predetermined location) associated with the electronic device 400, and may determine a first zone (e.g., a work zone such as an office) and a second zone (e.g., a personal life zone such as a home), which is different from the first zone, based on the obtained location information and time information. The processor 401 obtains a first time (e.g., a work time) during which the electronic device 400 is located in the first zone and a second time (e.g., a personal life time) during which the electronic device 400 is located in the second zone, and displays information associated with the obtained first time and second time on the user interface 403.

According to various embodiments, the processor 401 may obtain a third time (e.g., a sleep time) indicating a time during which a user sleeps in addition to the work time and the personal life time, and may display information associated with the obtained first time, second time, and third time on the user interface 403.

According to an embodiment, the processor 401 may analyze the obtained location information and time information, and may identify places where the electronic device 400 is located for the longest period of time within a designated period (e.g., a predetermined period of time, weekdays, a weekend, a holiday, a week, a month, and the like) as candidate zones. The processor 401 determines the places where the electronic device 400 remains at least a first threshold time (e.g., 5 to 6 hours) within a designated period, to be the places where the electronic device 400 is located for the longest period of time. The processor 401 may analyze the usage information of the electronic device 400 (e.g., a usage history of functions, programs, and applications which are used in a candidate zone, a contact information usage history, a usage history of a call, a message, an email, a messenger, and the like), may determine a zone where the electronic device is frequently used in association with work as a work zone from among the candidate zones, and may determine a zone where the electronic device is frequently used in association with personal life as a personal life zone.

For example, the processor 401 may identify two or more places where the electronic device 401 is located at least a first threshold time during weekdays, and may determine a first place that matches a place where the electronic device 401 is located during a weekend or a holiday from among the two or more identified places, as a candidate personal life zone. The processor 401 inquires of a user about whether the first place is a personal life zone, and determines the first place to be the personal life zone based on a user input. Alternatively, the processor 401 may analyze electronic device usage information associated with the first place (or the candidate personal life zone), and may determine the first place to be the personal life zone based on the analysis result. When the analysis result shows that the electronic device 400 is frequently used in association with personal life in the first place, the processor 401 may determine the first place (or candidate personal life zone) to be the personal life zone. The processor 401 may determine a place where a usage time of the electronic device in association with personal life (using games or shopping programs or applications or calling, messaging to, emailing to, communicating via a messenger with a person designated as a family group or friend group) is greater than or equal to a second threshold time (e.g., 5 hours) to be a place where the electronic device 400 is frequently used in association with personal life.

The processor 401 may determine a second place to be a candidate work zone, wherein the second place is different from the first place that has been determined to be the personal life zone. The processor 401 may analyze electronic device usage information associated with the second place which is determined to be the candidate work zone, and may determine the second place to be a work zone based on an analysis result. When the analysis result shows that the electronic device 400 is frequently used in association with work in the second place, the processor 401 may determine the second place to be a work zone. The processor 401 may determine a place where a usage time of the electronic device in association with work (using a work-related program or application, or calling, messaging to, emailing to, or communicating via a messenger with a person designated as a company group) is greater than or equal to a third threshold time (e.g., 5 hours) to be a place where the electronic device 400 is frequently used in association with work.

According to various example embodiments, the processor 401 may identify places where the electronic device 400 remains at least the first threshold time within a week or a month, and may determine a day when a single place is detected as a holiday. Alternatively, the processor 401 may analyze calendar information obtained through a calendar application to determine a holiday.

According to various example embodiments, the processor 401 may receive a user input for adding, correcting, or deleting a work zone or a personal life zone, and may add, correct, or delete the work zone or personal life zone based on the received user input.

According to an example embodiment, the processor 401 may analyze electronic device usage information associated with a first zone (e.g., a work zone), and may obtain a third time (e.g., a non-work-related time) expended for using the electronic device 400 in the first zone for use irrelevant to the first zone (or irrelevant to work), such as an irrelevant call history, contact information usage history, application usage history, Internet usage history, messenger usage history, and the like). The processor 401 may obtain a total work time excluding a non-work-related time from the work time in the work zone. The obtained non-work-related time may be added to a total personal life time.

For example, the processor 401 may analyze a call history, a contact information history, and the like, to determine a time taken for calling a group member belonging to a family group, a friend group, and the like in the work zone, to be the non-work-related time. The processor 401 may determine a time taken for using applications or programs, Internet, and a messenger irrelevant to work in the work zone, to be the non-work-related time, based on the usage history of games, shopping applications, the Internet, the messenger, and the like. The processor 401 may determine a personal time (e.g., exercise, break, personal event, and the like) expended in the work zone using a health application, a calendar application, and the like, to be the non-work-related time.

According to various example embodiments, the processor 401 may analyze location information and time information to obtain a time taken when the electronic device moves from the personal life zone to the work zone to get to the office (e.g., time required to commute to the office), and a time taken when the electronic device moves from the work zone to the personal life zone to leave from the office (time required to commute from the office). The processor 401 may add the obtained time taken for going to the office and time required for leaving the office to the total work time.

According to an example embodiment, the processor 401 analyzes electronic device usage information associated with the second zone (e.g., the personal life zone), and may obtain a fourth time (e.g., a non-personal-life-related time) expended for using the electronic device 400 in the second zone for use irrelevant to the second zone (or irrelevant to personal life), such as an irrelevant call history, contact information usage history, application usage history, Internet usage history, messenger usage history, and the like. The processor 401 may obtain a total personal life time excluding the obtained non-personal-life-related time from the personal life time in the personal life zone. The obtained non-personal-life-related time may be added to the total work time.

For example, the processor 401 may analyze a call history, a contact information history, and the like, to determine (or decide) a time taken for calling a group member belonging to a company group, and the like in the personal life zone, to be the non-personal-life-related time. When a call time is within a fourth threshold time (e.g., 5 minutes), which is set in advance, the processor 401 may not determine the time to be the non-personal-life-related time.

The processor 401 may determine a time taken for using applications or programs, the Internet, emails, a messenger for use irrelevant to personal life in the personal life zone, as the non-personal-life-related time, based on a usage history of work-related application, an access or usage history of the Internet for use related to work, a messenger usage history in association with a company group member, and the like.

According to various example embodiments, when the electronic device 400 is located at least a predetermined period of time (e.g., 30 minutes) in a predetermined zone, excluding the work zone and the personal life zone, the processor 401 may receive a user input indicating whether the event is associated with a work event or a personal life event. When the user input is received, the processor 401 may add the time during which the electronic device 400 is located in the predetermined zone to the total work time or the total personal life time.

According to an example embodiment, the processor 401 may display, on the user interface 403, comparison information between work and personal life based on the obtained total work time and total personal life time.

According to an example embodiment, the processor 401 may set a goal work time corresponding to a work time desired by a user, and a goal personal life time corresponding to a personal life time desired by the user. The goal work time and the goal personal life time may be set by a user input.

According to an example embodiment, the processor 401 may display, on the user interface 403, comparison information between the obtained total work time and the goal work time and comparison information between the obtained total personal life time and the goal personal life time.

According to various example embodiments, the processor 401 may obtain data acquired by measuring a user movement using a motion sensor or may receive data obtained by measuring a user movement from an external electronic device, such as an accessory device, and may measure a sleep time based on the measurement data. The processor 401 may obtain measurement data from an application for measuring a sleep time, or may obtain a sleep time by receiving a user input associated with a sleep start time and a sleep end time. For example, the processor 401 may determine, as a sleep time, a time during which a movement value measured through the motion sensor is less than a threshold value. The processor 401 may set a goal sleep time corresponding to a sleep time desired by a user, and may display comparison information between an obtained sleep time and the goal sleep time on the user interface 403.

According to various example embodiments, the processor 401 may determine a place where the electronic device 400 is located during the sleep time to be the personal life zone, and may determine a time taken when the electronic device 400 moves from the determined personal life zone to the work zone to be a time required to commute to the office.

According to various example embodiments, when the electronic device 400 moves to a predetermined place from the work zone, and is located at least a fifth threshold time (e.g., 30 minutes), the processor 401 determines the predetermined place to be the personal life zone, and determine a time taken when the electronic device 400 moves from the work zone to the determined personal life zone to be a time to commute from the office.

According to various example embodiments, the processor 401 may not obtain, as electronic device usage information, a time taken for using the electronic device 400 during mealtime (e.g., lunch time).

According to various example embodiments, the first through fifth threshold times may be arbitrary times, may be times set in advance, or may be set as various times without being limited to a predetermined time.

According to various example embodiments, the processor 401 may obtain a weekly work time corresponding to a work time during a week and a weekly personal life time corresponding to a personal life time during a week, and may obtain an average work time based on the obtained weekly work time and an average personal life time based on the obtained weekly personal life time. The processor 401 may display, on the user interface 403, comparison information between weekly work and weekly personal life based on the obtained average work time and average personal life time. The processor 401 may obtain a work time, a personal life time, and a sleep time for each day during a week, and may display information associated with the obtained work time, personal life time, and sleep time on the user interface 403.

According to various example embodiments, the processor 401 may obtain a monthly work time corresponding to a work time during a month and a monthly personal life time corresponding to a personal life time during a month, and may obtain an average work time based on the obtained monthly work time and an average personal life time based on the obtained monthly personal life time. The processor 401 may display, on the user interface 403, comparison information between the monthly work and the monthly personal life based on the obtained average work time and average personal life time. The processor 401 may obtain a work time, a personal life time, and a sleep time for each day during a month, and may display information associated with the obtained work time, personal life time, and sleep time on the user interface 403.

The sensor module 402 may include various sensing circuitry, such as, for example, and without limitation, a motion sensor for measuring the movement of the electronic device 400, and may transfer the movement value of the electronic device 400 measured through the motion sensor to the processor 401.

The user interface 403 may display comparison information between work and personal life, comparison information between a work time and a goal work time, comparison information between a total personal life time and a goal personal life time, comparison information between weekly work and weekly personal life, and comparison information between monthly work and monthly personal life, and the like.

The memory 404 may store all information used for comparison information between work and personal life, comparison information between a work time and a goal work time, comparison information between a total personal life time and a goal personal life time, comparison information between a weekly work and a weekly personal life, and comparison information between a monthly work and a monthly personal life, and the like.

The communication module 405 may include various communication circuitry and receive GPS information of the electronic device 400 or receive cell information or base station information from a base station, and may deliver the same to the processor 401.

According to various example embodiments, the electronic device 400 may include: the user interface 403; the processor 401 electrically connected to the user interface 403; and the memory 404 electrically connected to the processor 401. The memory 404 may store instructions which when executed cause the processor 401 to perform operations including: determining a first zone (work zone) and a second zone (personal life zone), which is different from the first zone, based on location information and time information associated with the electronic device 400; obtaining a first time during which the electronic device 400 is located in the first zone and a second time during which the electronic device 400 is located in the second zone; and displaying information associated with the first time and the second time on the user interface.

Figure 5:
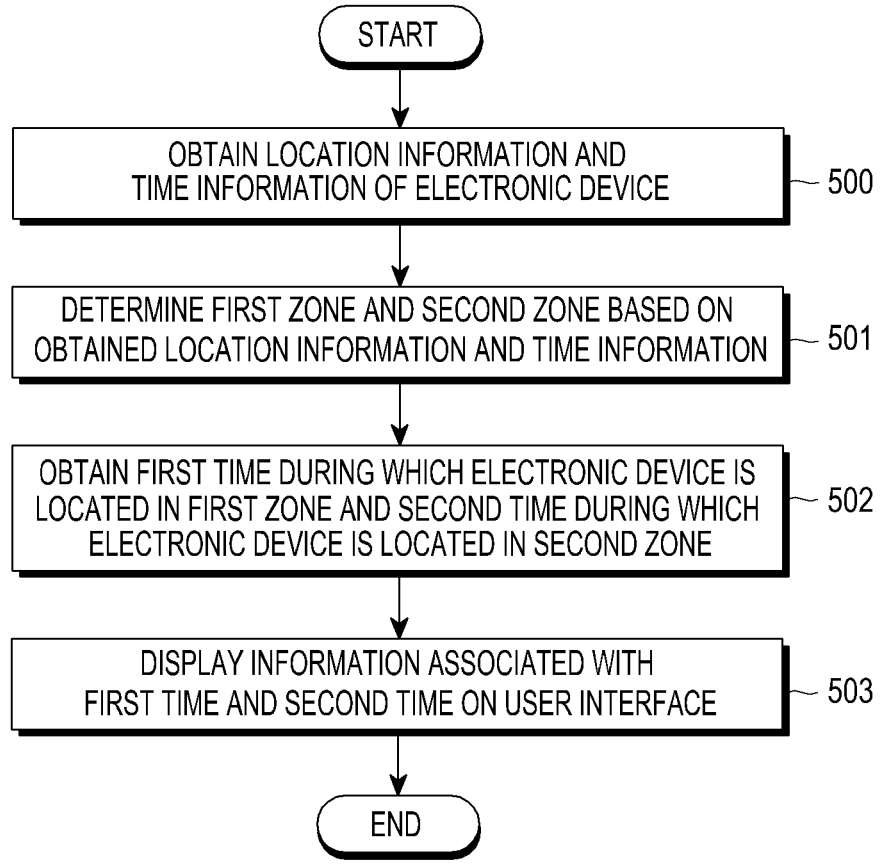
FIG. 5 is a flowchart illustrating an example method of providing comparison information between work and personal life by an electronic device according to various example embodiments.

FIG. 5 is a flowchart illustrating an example method of providing comparison information between work and personal life by an electronic device according to various example embodiments.

According to various embodiments, operations 500 to 503 may be executed through one of the electronic device 101, 201, or 400, the server 106, the processor 120, 210, or 401, and the program module 310.

Referring to FIG. 5, the electronic device 400 (e.g., the processor 401) obtains location information and time information of the electronic device 400 in operation 500. According to an embodiment, the electronic device 400 (e.g., the processor 401) may receive location information (e.g., GPS information, cell information, base station information, and the like) through the communication module 405 periodically or during a predetermined period of time, and may obtain time information indicating a time during which the electronic device is located in association with the received location information.

In operation 501, the electronic device 400 (e.g., the processor 401) determines a first zone (e.g., a work zone) and a second zone (e.g., a personal life zone) based on the obtained location information and time information. According to an embodiment, the electronic device 400 (e.g., the processor 401) may analyze the collected location information and time information, may identify places where the electronic device 400 remains for the longest period of time, and may determine the identified places as the first zone (e.g., the work zone) or the second zone (e.g., the personal life zone).

In operation 502, the electronic device 400 (e.g., the processor 401) obtains a first time during which the electronic device 400 is located in the first zone and a second time during which the electronic device 400 is located in the second zone. According to an embodiment, the electronic device 400 (e.g., the processor 401) may obtain a work time during which the electronic device 400 is located in the work zone and a personal life time during which the electronic device 400 is located in the personal life zone.

In operation 503, the electronic device 400 (e.g., the processor 401) may display information associated with the obtained first time and second time on the user interface 403. According to an embodiment, the electronic device 400 (e.g., the processor 401) may display comparison information between the obtained work time and personal life time on the user interface 403. According to an embodiment, the electronic device 400 (e.g., processor 401) may display, on the user interface 403, comparison information between the obtained work time and a goal work time set in advance and comparison information between the obtained personal life time and a goal personal life time set in advance.

Figure 6:
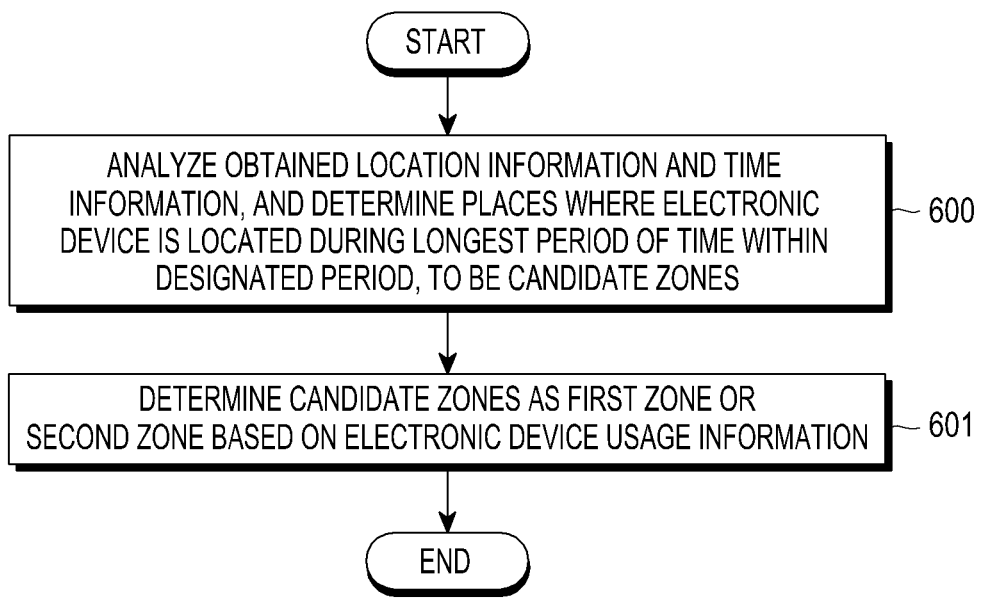
FIG. 6 is a flowchart illustrating an example method of determining a first zone and a second zone by an electronic device according to various example embodiments.

FIG. 6 is a flowchart illustrating an example method of determining a first zone and a second zone by an electronic device according to various example embodiments.

According to various embodiments, operations 600 to 601 may be executed through one of the electronic device 101, 201, or 400, the server 106, the processor 120, 210, or 401, and the program module 310.

Referring to FIG. 6, in operation 600, the electronic device 400 (e.g., the processor 401) analyzes obtained location information and time information, and determines places where the electronic device 400 is located for the longest period of time within a designated period as candidate zones. According to an embodiment, the electronic device 400 (e.g., the processor 401) may identify the places where the electronic device 401 is located for the longest period of time within the designated period (e.g., a predetermined period of time, weekdays, a weekend, a holiday, a week, a month, and the like). The electronic device 400 (e.g., the processor 401) may determine a place where the electronic device 400 is located at least a first threshold time (e.g., 5-6 hours) to be a place where the electronic device 400 is located for the longest period of time.

In operation 601, the electronic device 400 (e.g., the processor 401) determines the candidate zones as a first zone or a second zone based on the usage information of the electronic device 400.

According to an embodiment, the electronic device 400 (the processor 401) may analyze the usage information of the electronic device 400 (e.g., a usage history of functions, programs, and applications which are used in a candidate zone, a contact information usage history, a usage history of a call, a message, an email, a messenger, and the like), may determine a zone where the electronic device is frequently used in association with work as a work zone from among the candidate zones, and may determine a zone where the electronic device is frequently used in association with personal life as a personal life zone.

Figure 7:
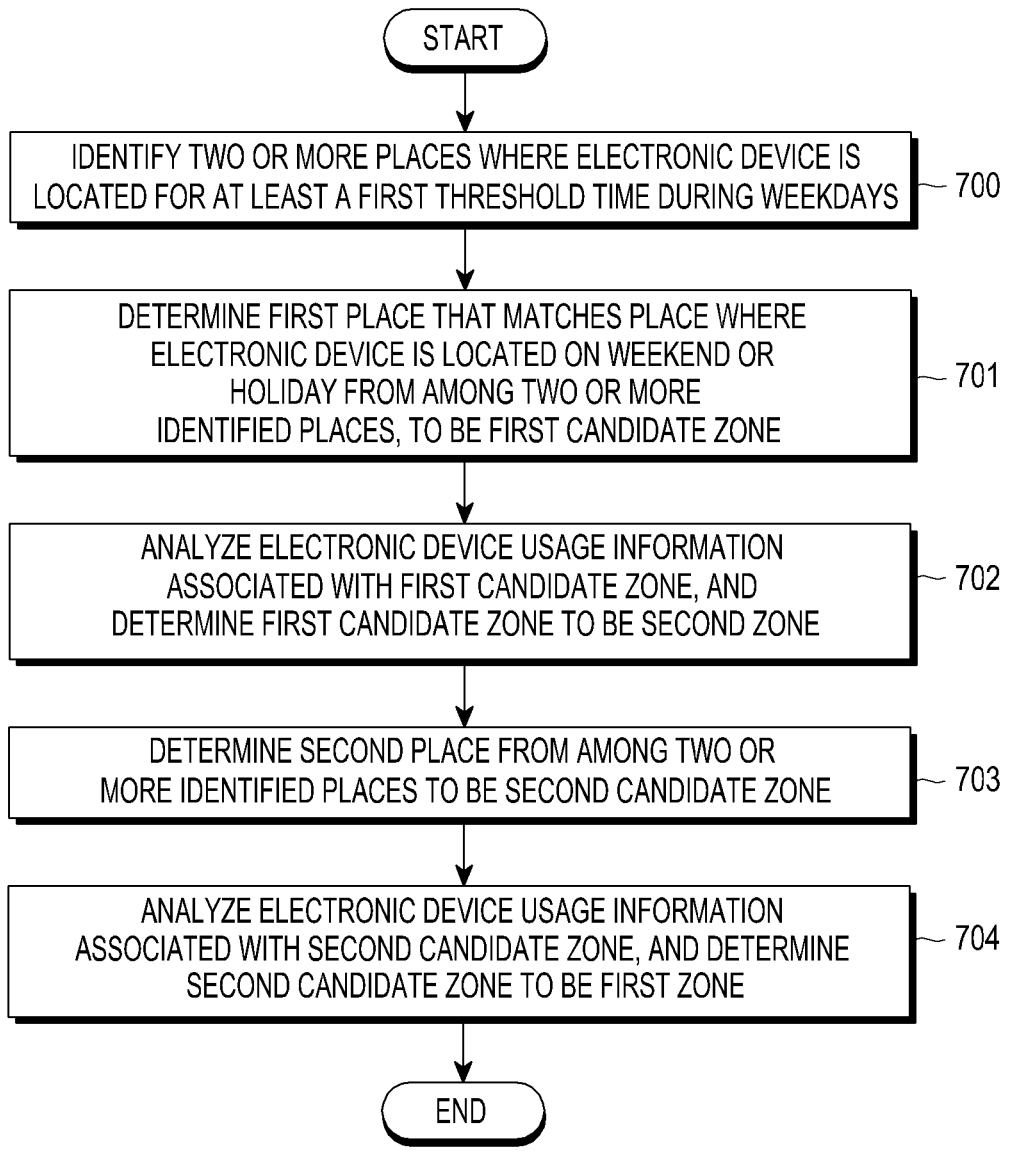
FIG. 7 is a flowchart illustrating an example method of determining a first zone and a second zone by an electronic device according to various example embodiments.

FIG. 7 is a flowchart illustrating an example method of determining a first zone and a second zone by an electronic device according to various example embodiments.

According to various embodiments, operations 700 to 704 may be executed through one of the electronic device 101, 201, or 400, the server 106, the processor 120, 210, or 401, and the program module 310.

Referring to FIG. 7, in operation 700, the electronic device 400 (e.g., the processor 401) identifies two or more places where the electronic device 401 is located at least a first threshold time during weekdays.

In operation 701, the electronic device 400 (e.g., the processor 401) determines a first place that matches a place where the electronic device 400 is located during a weekend or a holiday from among the two or more identified places, as a first candidate zone (e.g., a candidate personal life zone).

In operation 702, the electronic device 400 (e.g., the processor 401) analyzes electronic device usage information associated with the first candidate zone and determines the first candidate zone to be a second zone (e.g., a personal life zone). The electronic device usage information may include call records, contact information usage history, a usage history of programs or applications, an Internet usage history, a messenger usage history, and the like. According to an embodiment, when the electronic device 400 (e.g., the processor 401) is frequently used in association with personal life in the first candidate zone, the electronic device 400 (e.g., the processor 401) may determine the first candidate zone to be the second zone (e.g., personal life zone). For example, when the electronic device 400 is frequently used for use relevant to personal life, such as the use of personal-life-related applications such as for gaming or shopping, or calling, messaging to, emailing to, communicating via a messenger with a person designated as a family group or friend group, and the like, the electronic device 400 (e.g., the processor 401) may determine the first candidate zone to be the second zone (e.g., personal life zone).

In operation 703, the electronic device 400 (e.g., the processor 401) determines a second place out of the two or more identified places as a second candidate zone (e.g., a candidate work zone).

In operation 704, the electronic device 400 (e.g., the processor 401) analyzes electronic device usage information associated with the second candidate zone and determines the second candidate zone to be a first zone (e.g., a personal life zone). According to an embodiment, when the electronic device 400 is frequently used in association with work in the second candidate zone, the electronic device 400 (e.g., the processor 401) may determine the second candidate zone to be the first zone (e.g., work zone). For example, when the electronic device 400 is frequently used for use relevant to work, such as the use of work-related programs or applications or calling, messaging to, emailing to, communicating via a messenger with a person designated as a company group, and the like, the electronic device 400 (e.g., the processor 401) may determine the second candidate zone to be the first zone (e.g., work zone).

Figure 8:
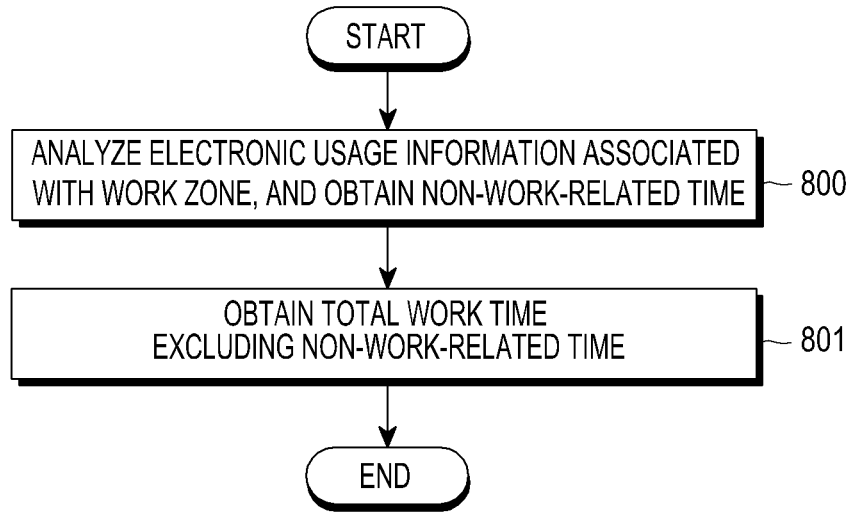
FIG. 8 is a flowchart illustrating an example method of obtaining a total work time by an electronic device according to various example embodiments.

FIG. 8 is a flowchart illustrating an example method of obtaining a total work time by an electronic device according to various example embodiments.

According to various embodiments, operations 800 to 801 may be executed through one of the electronic device 101, 201, or 400, the server 106, the processor 120, 210, or 401, and the program module 310.

Referring to FIG. 8, in operation 800, the electronic device 400 (e.g., the processor 401) analyzes electronic device usage information associated with a work zone, and obtains a non-work-related time taken for using the electronic device for use irrelevant to work in the work zone. According to an embodiment, the electronic device 400 (e.g., the processor 401) may analyze call records, a contact information usage history, an application usage history, an Internet usage history, a messenger usage history, a commuting time, and the like in the work zone. The electronic device 400 (e.g., the processor 401) may determine a time taken for using a non-work-related application, such as for games, shopping, and the like, a time taken for using Internet content irrelevant to work, a time taken for using a messenger with persons irrelevant to work (e.g., persons designated as a family group, a friend group, or the like with conversations including personal-life-related words (e.g., mom, dad, friend, family, hey, or the like)), a time taken for using a social network service (SNS) irrelevant to work, a personal time (e.g., exercise, personal event, or the like), or the like, as the non-work-related time.

In operation 801, the electronic device 400 (e.g., the processor 401) obtains a total work time excluding the non-work-related time. According to an embodiment, the electronic device 400 (e.g., the processor 401) may calculate a time remaining after excluding the non-work-related time from a time during which the electronic device 400 remains in the work zone, as the total work time (or an actual work time). The electronic device 400 (e.g., the processor 401) may determine a commuting time as a work time, and may add the commuting time to the time during which the electronic device 400 remains in the work zone.

Figure 9:
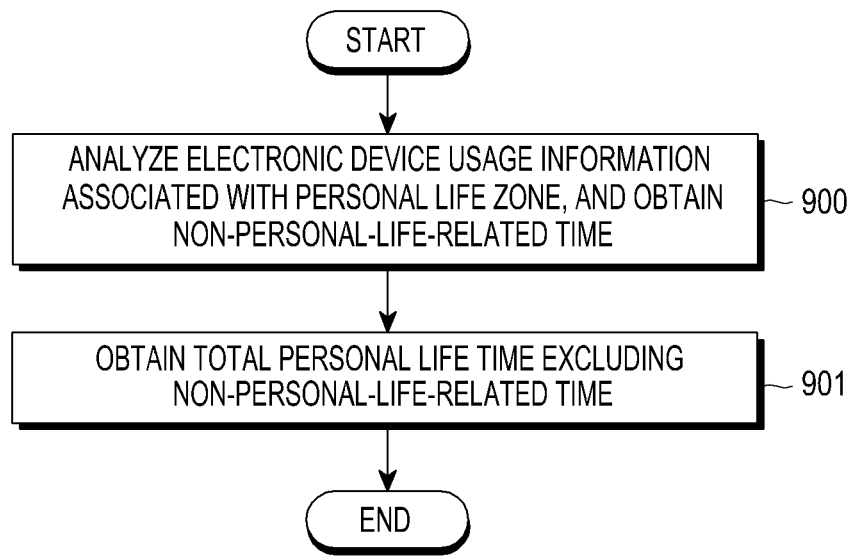
FIG. 9 is a flowchart illustrating an example method of obtaining a total personal life time by an electronic device according to various example embodiments.

FIG. 9 is a flowchart illustrating an example method of obtaining a total personal life time by an electronic device according to various example embodiments.

According to various embodiments, operations 900 to 901 may be executed through one of the electronic device 101, 201, or 400, the server 106, the processor 120, 210, or 401, and the program module 310.

Referring to FIG. 9, in operation 900, the electronic device 400 (e.g., the processor 401) analyzes electronic device usage information associated with a personal life zone, and obtains a non-personal-life-related time taken for using the electronic device for use irrelevant to personal life in the personal life zone. According to an embodiment, the electronic device 400 (e.g., the processor 401) may analyze call records, a contact information usage history, an application usage history, an Internet usage history, a messenger usage history, and the like in the personal life zone. The electronic device 400 (e.g., the processor 401) may analyze the call history and the contact information usage history, and may determine a call time taken for calling persons related to work (e.g., contacts included in a company group) in the personal life zone, as the non-personal-life-related time. The electronic device 400 (e.g., the processor 401) may determine the time taken for using work-related programs or applications, the time taken for using Internet content related to work, the time taken for using a messenger with persons related to work (e.g., persons designated as a company group with conversations including work-related words (e.g., Mr./Ms., a manager, work, meeting, or the like)), a time taken for using a work-related messenger, or the like, as the non-personal-life-related time.

In operation 901, the electronic device 400 (e.g., the processor 401) obtains a total personal life time remaining after excluding the non-personal-life-related time. According to an embodiment, the electronic device 400 (e.g., the processor 401) may calculate a time remaining after excluding the non-personal-life-related time from a time during which the electronic device 400 remains in the personal life zone, as the total personal life time (or an actual personal life time).

Figure 10:
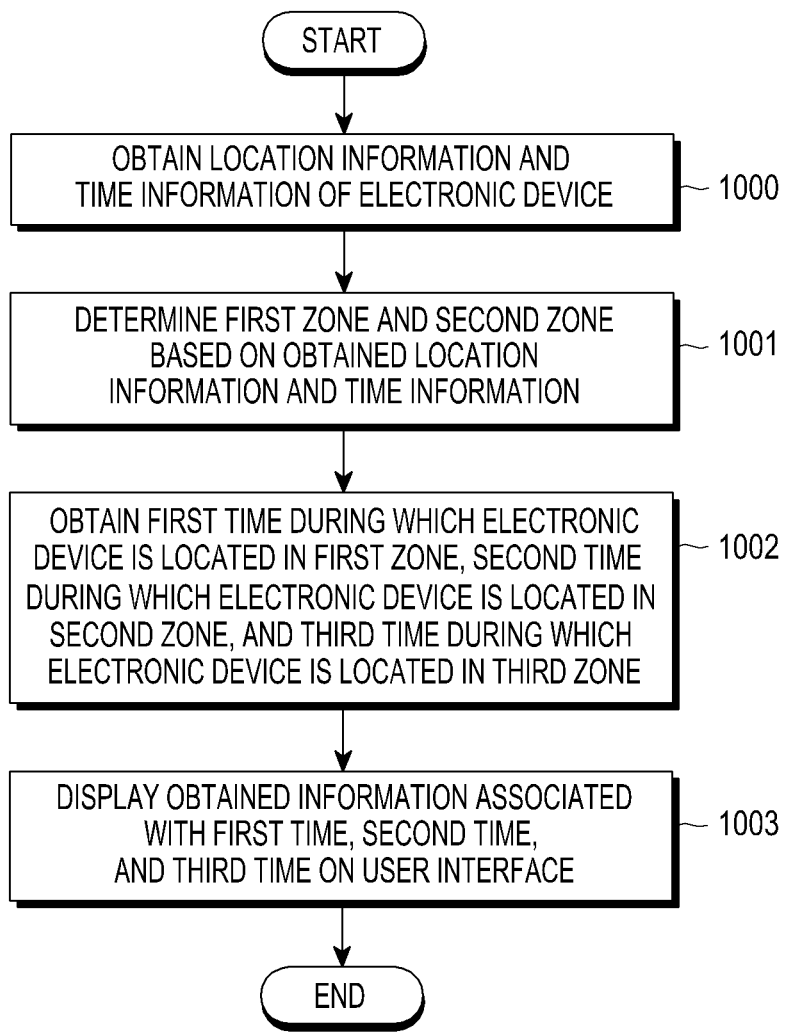
FIG. 10 is a flowchart illustrating an example method of providing comparison information among work, personal life, and sleep by an electronic device according to various example embodiments.

FIG. 10 is a flowchart illustrating an example method of providing comparison information among work, personal life, and sleep by an electronic device according to various example embodiments.

According to various embodiments, operations 1000 to 1003 may be executed through one of the electronic device 101, 201, or 400, the server 106, the processor 120, 210, or 401, and the program module 310.

Referring to FIG. 10, in operation 1000, the electronic device 400 (e.g., the processor 401) obtains location information and time information of the electronic device 400.

In operation 1001, the electronic device 400 (e.g., the processor 401) determines a first zone (e.g., a work zone) and a second zone (e.g., a personal life zone) based on the obtained location information and time information.

In operation 1002, the electronic device 400 (e.g., the processor 401) obtains a first time during which the electronic device 400 is located in the first zone, a second time during which the electronic device 400 is located in the second zone, and a third time during which the electronic device 400 is located in a third zone. The third zone may be the first zone, the second zone, or another zone. The third time during which the electronic device 400 is located in the third zone may be a time that the user sleeps in the work zone, the personal life zone, or another zone.

According to an embodiment, the electronic device 400 (e.g., the processor 401) may measure the movement of the electronic device 400 using the sensor module 402, and may analyze the measured movement to estimate a sleep time. Alternatively, the electronic device 400 may obtain measurement data from an application for measuring a sleep time or receive a user input associated with a sleep start time and a sleep end time, and may obtain the sleep time.

In operation 1003, the electronic device 400 (e.g., the processor 401) displays information associated with the obtained first time, second time, and third time on the user interface 403. According to an embodiment, the electronic device 400 (e.g., processor 401) may display, on the user interface 403, comparison information between the obtained work time and a goal work time set in advance, comparison information between the obtained personal life time and a goal personal life time set in advance, and comparison information between the obtained sleep time and a goal sleep time set in advance.

Figure 11A:
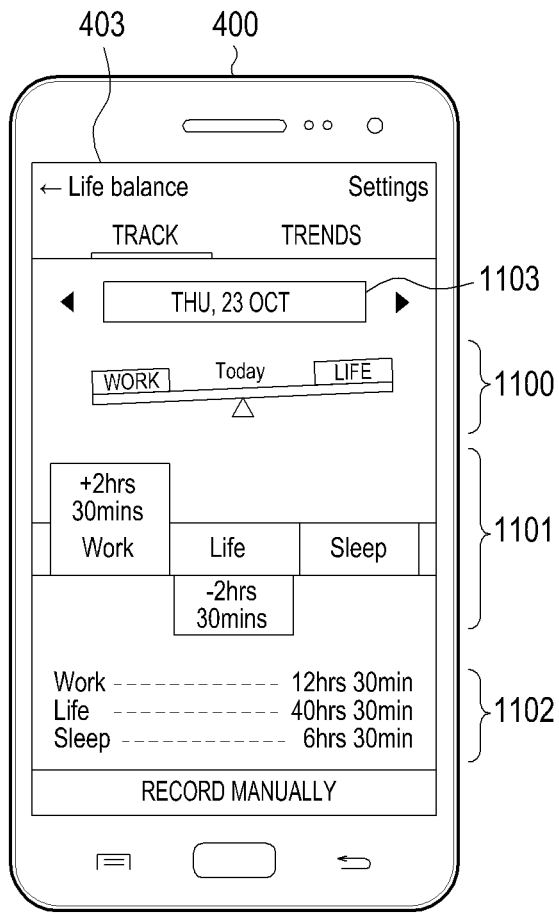
FIGS. 11A and 11B are diagrams illustrating examples of comparison information among work, personal life, and sleep based on a day, displayed by an electronic device according to various example embodiments.
Figure 11B:
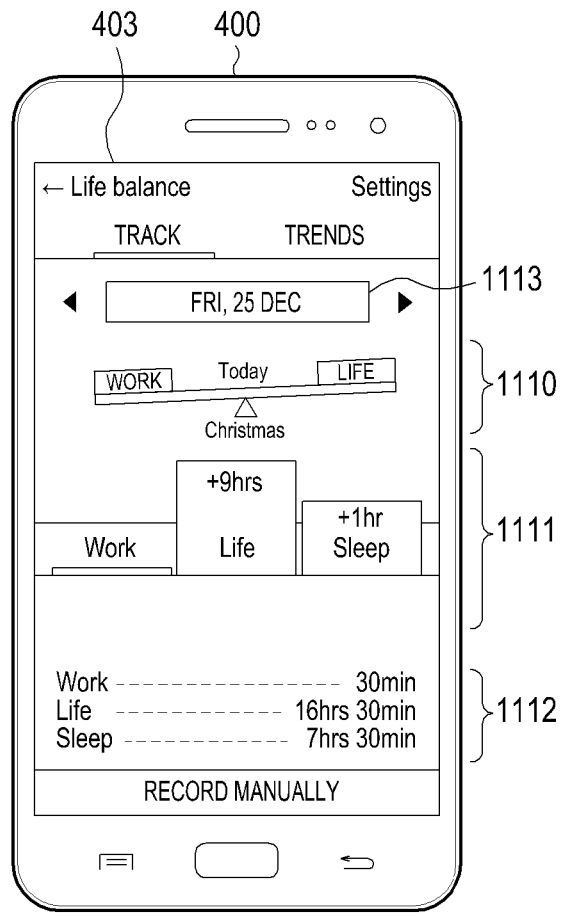

FIGS. 11A and 11B are diagrams illustrating examples of comparison information among work, personal life, and sleep based on a day, displayed by an electronic device according to various example embodiments.

Referring to FIGS. 11A and 11B, the electronic device 400 (e.g., the processor 401) may display, on the user interface 403, a first object 1100 indicating comparison information between work and personal life by comparing an obtained work time and personal life time, a second object 1101 indicating comparison information between the obtained work time and a goal work time, comparison information between the obtained personal life time and a goal personal life time, and comparison information between an obtained sleep time and a goal sleep time, and a third object 1102 indicating a total work time, a total personal life time, and a total sleep time, as illustrated in FIG. 11A.

For example, on the 23rd of October (a weekday) 1103, when a goal work time is 10 hours, a goal personal life time is 7 hours, and a goal sleep time is 6 hours and 30 minutes, the electronic device 400 (e.g., the processor 401) may obtain a total work time of 12 hours and 30 minutes, a total personal life time of 4 hours and 30 minutes, and a total sleep time of 6 hours and 30 minutes. In this instance, since the total work time exceeds the goal work time, the total personal life time is less than the goal personal life time, the electronic device 400 (e.g., the processor 401) may determine there is an imbalance between work and personal life. Accordingly, the electronic device 400 (e.g., the processor 401) may display the first object 1100 of FIG. 11A in the form of a seesaw or a scale in a manner in which the balance between the work and the personal life is tilted toward work. The electronic device 400 (e.g., the processor 401) may display the second object 1101 indicating that the total work time exceeds the goal work time (e.g., 10 hours) by 2 hours and 30 minutes, the total personal life time is below the goal personal life time (7 hours) by 2 hours and 30 minutes, and the total sleep time is identical to the goal sleep time (e.g., 6 hours and 30 minutes). The electronic device 400 (e.g., the processor 401) may display the third object 1102 indicating that the total work time is 12 hours and 30 minutes, the total personal life time is 4 hours and 30 minutes, and the total sleep time is 6 hours and 30 minutes.

For example, referring to FIG. 11B, when the goal work time is 0 hours, the goal personal life time is 7 hours, and a goal sleep time is 6 hours and 30 minutes on the 25th of December (Christmas) 1113, the electronic device 400 (e.g., the processor 401) may obtain a total work time of 30 minutes, a total personal life time of 16 hours, and a total sleep time of 7 hours and 30 minutes. The goal work time is set to 0 for a holiday, and holiday or vacation information may be obtained from a calendar application. In this instance, the electronic device 400 (e.g., the processor 401) calculates the total work time on a holiday and thus, may determine that there is an imbalance between work and personal life. Accordingly, the electronic device 400 (e.g., the processor 401) may display the first object 1110 of FIG. 11B in the form of a seesaw or a scale in a manner in which the balance between work and personal life is tilted toward work. The electronic device 400 (e.g., the processor 401) may display the second object 1111 indicating that the total work time exceeds the goal work time (e.g., 0 hours) by 30 minutes, the total personal life time exceeds the goal personal life time (7 hours) by 9 hours, and the total sleep time exceeds the goal sleep time (e.g., 6 hours and 30 minutes) by 1 hour. The electronic device 400 (e.g., the processor 401) may display the third object 1112 indicating that the total work time is 30 minutes, the total personal life time is 16 hours, and the total sleep time is 7 hours and 30 minutes.

Figure 12A:
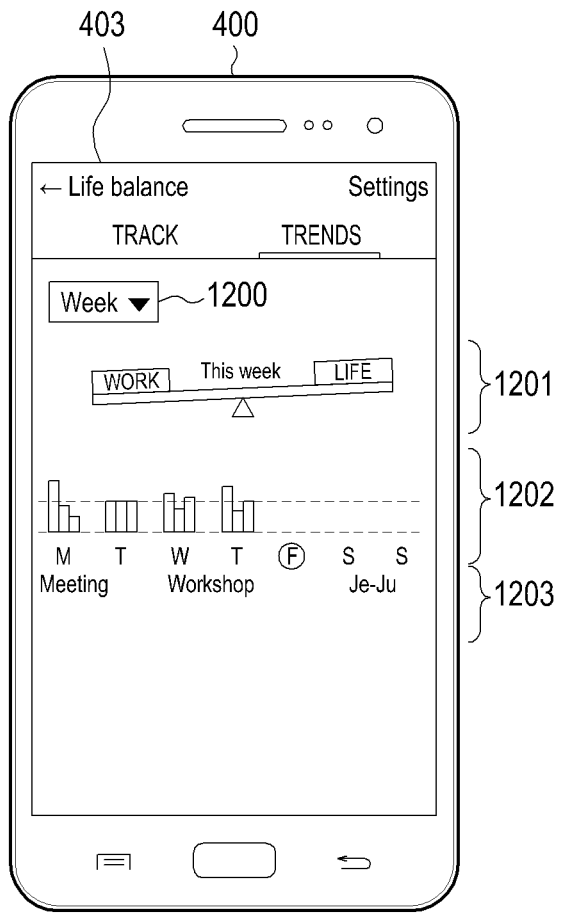
FIGS. 12A and 12B are diagrams illustrating examples of comparison information among work, personal life, and sleep based on a week, and comparison information among work, personal life, and sleep based on a month, displayed by an electronic device according to various example embodiments.
Figure 12B:
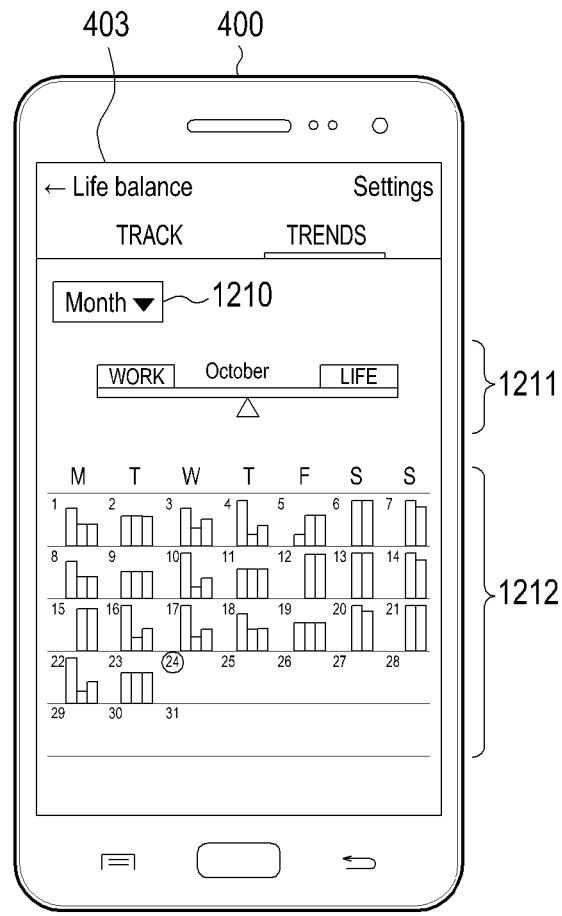

FIGS. 12A and 12B are diagrams illustrating examples of displaying comparison information among work, personal life, and sleep based on a week, and comparison information among work, personal life, and sleep based on a month by an electronic device according to various example embodiments.

Referring to FIGS. 12A and 12B, the electronic device 400 (e.g., the processor 401) may display comparison information between weekly work, personal life, and sleep on the user interface 403, as illustrated in FIG. 12A. According to an embodiment, the electronic device 400 (e.g., the processor 401) may display a first object 1201 indicating comparison information between weekly work and weekly personal life obtained by comparing the weekly work time and the weekly personal life time, and a second object 1202 indicating a weekly work time, a weekly personal life time, and a weekly sleep time, on the user interface 403 as illustrated in FIG. 12A. For example, when a third object 1203 for providing comparison information between weekly work, personal life, and sleep is selected, the electronic device 400 (e.g., the processor 401) may obtain a work time, a personal life time, and a sleep time during a week, and may obtain an average work time of the work time during the week, and an average personal life time of the personal life time during the week. The electronic device 400 (e.g., the processor 401) may compare the obtained average work time and average personal life time, and may determine that there is an imbalance between weekly work and weekly personal life when the average work time is greater than the average personal life time. Accordingly, the electronic device 400 (e.g., the processor 401) may display the first object 1201 of FIG. 12A in the form of a seesaw or a scale in a manner in which the balance between weekly work and weekly personal life is tilted toward work. The electronic device 400 (e.g., the processor 401) may illustrate the second object 1202 reflecting a work time, a personal life time, and a sleep time obtained for each day of the week in the form of a graph.

According to various example embodiments, the electronic device 400 (e.g., the processor 401) may obtain event information registered in a calendar application, and may display the third object 1203 reflecting the obtained event information for each day of the week, on the user interface 403.

Referring to FIGS. 12A and 12B, the electronic device 400 (e.g., the processor 401) may display comparison information between monthly work, personal life, and sleep on the user interface 403, as illustrated in FIG. 12B. According to an embodiment, the electronic device 400 (e.g., the processor 401) may display a first object 1211 indicating comparison information between monthly work and monthly personal life obtained by comparing the monthly work time and the monthly personal life time, and a second object 1212 indicating a monthly work time, a monthly personal life time, and a monthly sleet time, on the user interface 403 as illustrated in FIG. 12B. For example, when a fourth object 1210 for providing comparison information between monthly work, personal life, and sleep is selected, the electronic device 400 (e.g., the processor 401) may obtain a work time, a personal life time, and a sleep time during a month, and may obtain an average work time of the work time during the month, and an average personal life time of the personal life time during the month. The electronic device 400 (e.g., the processor 401) may compare the obtained average work time and average personal life time, and may determine that there is a balance between the monthly work and the monthly personal life when the average work time is equal to the average personal life time. Accordingly, the electronic device 400 (e.g., the processor 401) may display the balance between the monthly work and the monthly personal life in the form of a seesaw or a scale as shown in the first object 1211 of FIG. 12B. The electronic device 400 (e.g., the processor 401) may illustrate the second object 1212 reflecting a work time, a personal life time, and a sleep time obtained for each day of the month in the form of a graph.

Figures 13A, 13B:
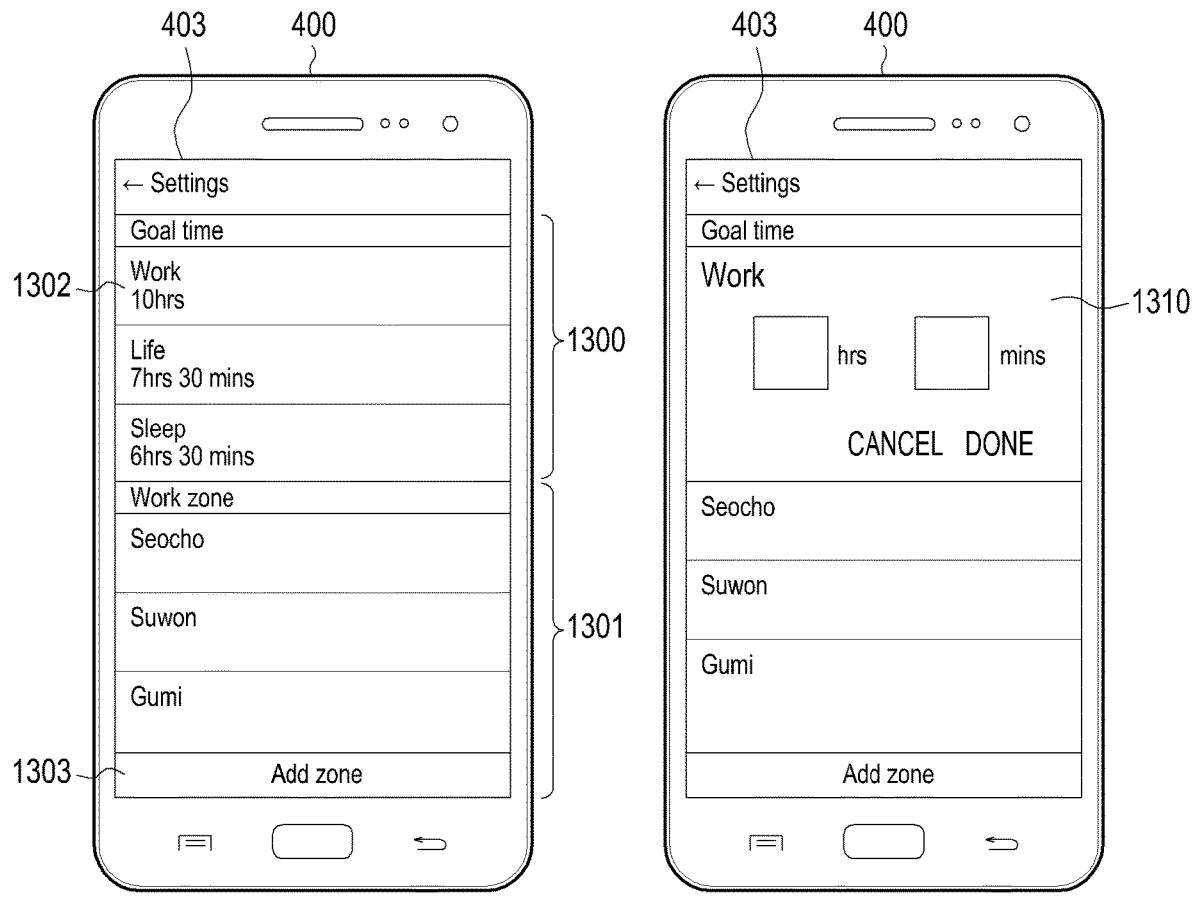
FIGS. 13A, 13B and 13C are diagrams illustrating examples of a method of setting a goal time and a work zone according to various example embodiments.
Figure 13C:
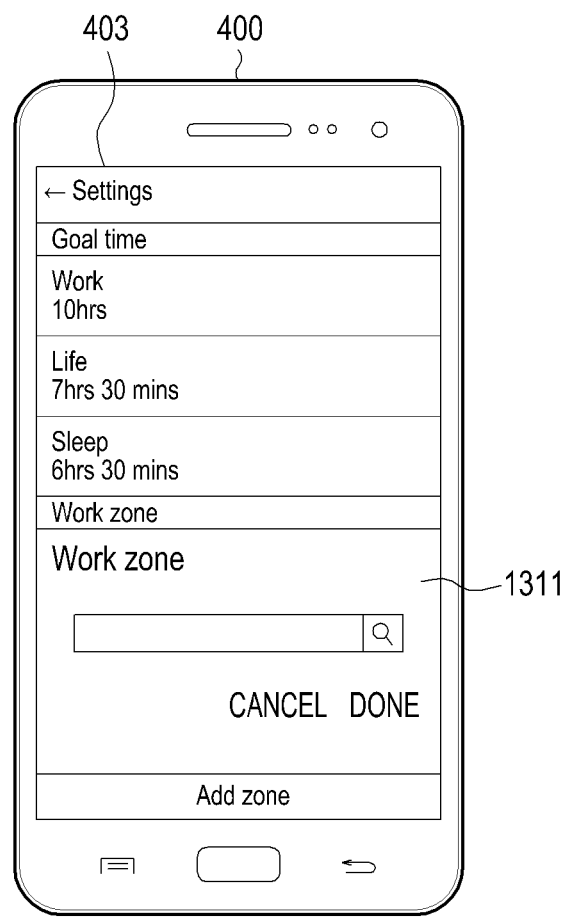

FIGS. 13A, 13B and 13C are diagrams illustrating examples of a method of setting a goal time and a work zone according to various example embodiments.

Referring to FIGS. 13A, 13B and 13C, the electronic device 400 (e.g., the processor 401) may display a first area 1300 for setting a goal time for work (e.g., a goal work time), a goal time for personal life (e.g., a goal personal life time), and a goal time for sleep (e.g., a goal sleep time), and a second area 1301 for setting a work zone, on the user interface 403 as illustrated in FIG. 13A.

According to an embodiment, the electronic device 400 (e.g., the processor 401) may display a setting screen 1310 for receiving a user input associated with a goal work time according to an event for setting a goal work time (e.g., a touch input provided on a work item 1302), as illustrated in FIG. 13B. As a user input is received through the setting screen 1310, the electronic device 400 may set the goal work time based on the user input.

According to an embodiment, the electronic device 400 (e.g., the processor 401) may display a setting screen 1311 for receiving a user input associated with a work zone according to an event for setting (or adding) a work zone (e.g., an add zone item 1303), as illustrated in FIG. 13C. As a user input is received through the setting screen 1311, the electronic device 400 may search for a work zone based on the user input, and may set (or add) the retrieved work zone.

Figure 14A:
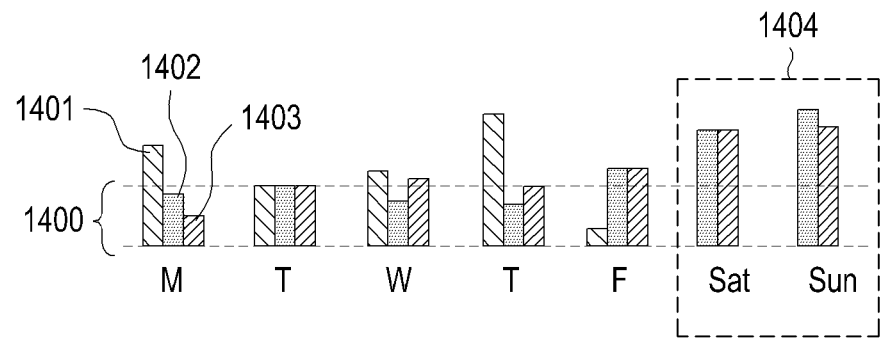
FIGS. 14A and 14B are diagrams illustrating examples of weekly comparison information and monthly comparison information according to various example embodiments.
Figure 14B:
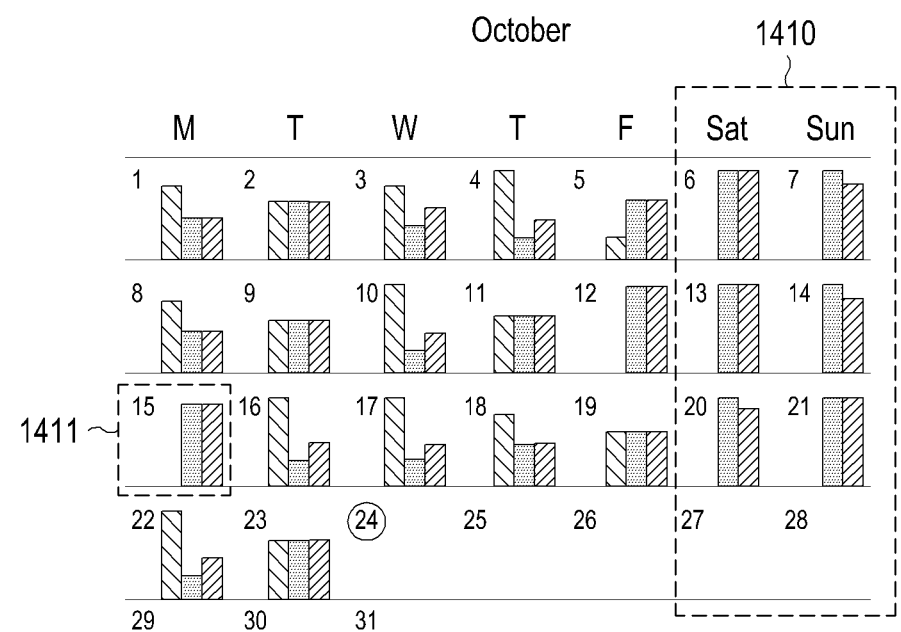

FIGS. 14A and 14B are diagrams illustrating examples of weekly comparison information and monthly comparison information according to various example embodiments.

Referring to FIGS. 14A and 14B, the electronic device 400 (e.g., the processor 401) displays comparison information of a work time, a personal life time, and a sleep time of Monday (M), Tuesday (T), Wednesday (W), Thursday (T), Friday (F), Saturday (S), and Sunday (S), with a goal time 1400 (e.g., a goal work time, a goal personal life time, and a goal sleep time), as illustrated in FIG. 14A. For example, in the case of Monday, when a calculated work time exceeds a goal work time, a calculated personal life time is identical to a goal personal life time, and a calculated sleep time is identical to a goal sleep time, the electronic device 400 (e.g., the processor 401) displays comparison information indicating that a calculated work time 1401 exceeds a goal work time 1400, a calculated personal life time 1402 is identical to the goal personal life time 1400, and a calculated sleep time 1403 is identical to the goal sleep time 1400. The electronic device 400 (e.g., the processor 401) may determine that a day of the week 1404 on which only a personal life time and a sleep time are calculated, to be a weekend or a holiday, and may determine a place where the electronic device 400 was located (or remained) on the day determined to be a weekend or holiday, to be a personal life zone.

Referring to FIGS. 14A and 14B, the electronic device 400 (e.g., the processor 401) displays comparison information of a work time, a personal life time, and a sleep time for each day of the month, with a goal time (e.g., a goal work time, a goal personal life time, and a goal sleep time), as shown in the FIG. 14B. The electronic device 400 (e.g., the processor 401) may determine the days of month 1410 and 1411 on which only a personal life time and a sleep time are calculated, to be weekends or holidays, and may determine a place where the electronic device 400 was located (or remained) on the days determined to be weekends or holidays, as a personal life zone.

Figure 15A:
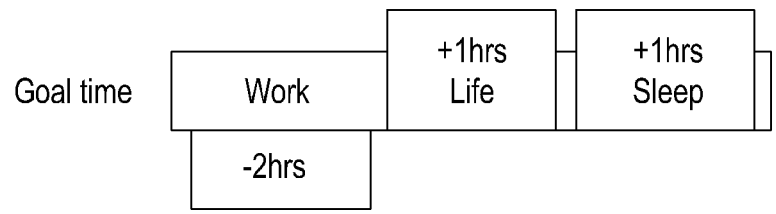
FIGS. 15A, 15B, and 15C are diagrams illustrating examples of comparison information among a work time, a personal life time, and a sleep time according to various example embodiments.
Figure 15A:
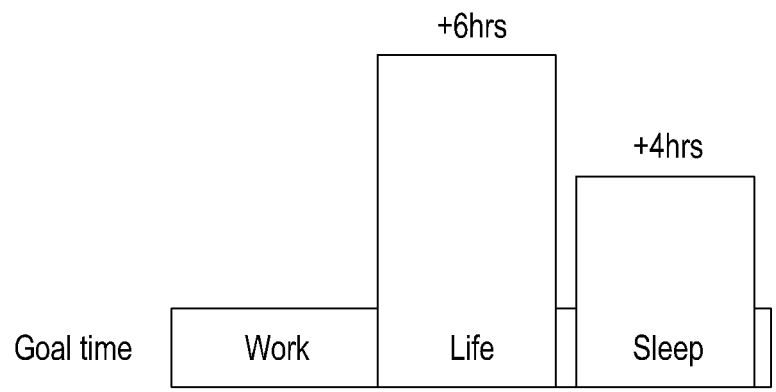
Figure 15B:
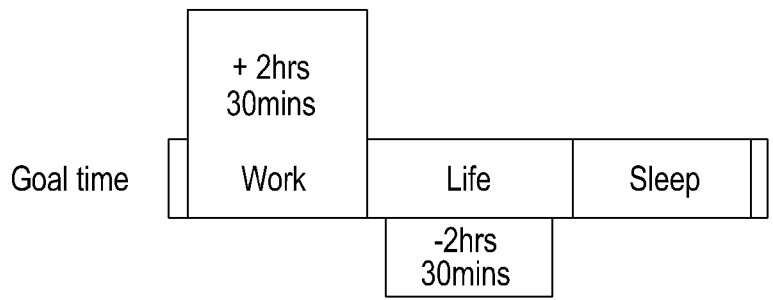
Figure 15B:
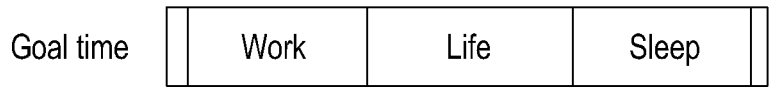
Figure 15C:
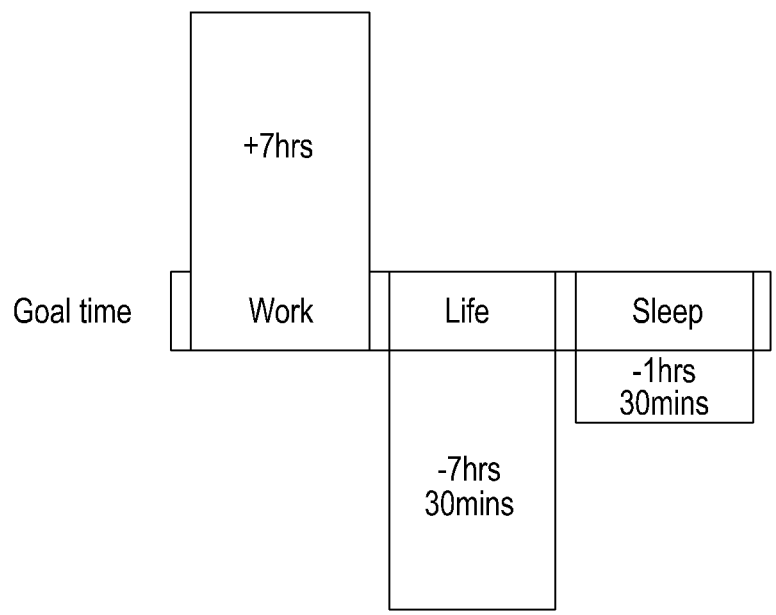
Figure 15C:
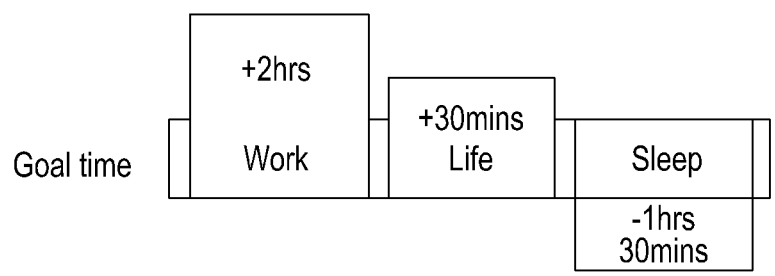

FIGS. 15A, 15B, and 15C are diagrams illustrating examples of comparison information among a working time, a personal life time, and a sleeping time according to various example embodiments.

According to an embodiment, the electronic device 400 (e.g., the processor 401) may calculate a work time, a personal life time, and a sleep time of a predetermined day, may compare calculated times with goal times, and may display information indicating how much each calculated time exceeds or is below a goal time, or indicating a matched time between each calculated time and a goal time, according to a comparison result. Based on the comparison result, the electronic device 400 (e.g., the processor 401) may determine whether a user has a balance between work and personal life on the predetermined day.

For example, when the goal work time of the current day is 10 hours, the goal personal life time is 7 hours and 30 minutes, and the goal sleep time is 6 hours and 30 minutes, the electronic device 400 (e.g., the processor 401) may analyze location information and time information of the electronic device 400 collected during the current day, and may obtain a total work time of 8 hours, a total personal life time of 8 hours and 30 minutes, and a total sleep time of 7 hours and 30 minutes. The electronic device 400 (e.g., the processor 401) may display comparison information of the total work time, total personal life time, and total sleep time with the goal times, as shown in the diagram at the top of FIG. 15A. The comparison information may display that the total work time is below the goal work time by 2 hours (−2 hrs), the total personal life time exceeds the goal personal life time by 1 hour (+1 hrs), and the total sleep time exceeds the goal sleep time by 1 hour (+1 hrs), in the form of a graph, as shown in the diagram on the top of FIG. 15A. In this instance, the electronic device 400 (e.g., the processor 401) may determine that the amount of work is below for the current day since the total work time of the current day is less than the goal work time.

For example, when a goal work time of the current day is 0 hours, a goal personal life time is 7 hours and 30 minutes, and a goal sleep time is 6 hours and 30 minutes, the electronic device 400 (e.g., the processor 401) may analyze location information and time information of the electronic device 400 collected during the current day, and may obtain a total work time of 0 hours, a total personal life time of 13 hours and 30 minutes, and a total sleep time of 10 hours and 30 minutes. The electronic device 400 (e.g., the processor 401) may display comparison information of the total work time, total personal life time, and total sleep time with the goal times, as shown in the diagram at the bottom of FIG. 15A. The comparison information may display that the total work time is identical to the goal work time, the total personal life time exceeds the goal personal life time by 6 hours (+6 hrs), and the total sleep time exceeds the goal sleep time by +4 hours (+1 hrs), in the form of a graph, as shown in the diagram at the bottom of FIG. 15A. In this instance, the electronic device 400 (e.g., the processor 401) may determine that the current day is a holiday since the total work time of the current day is identical to the goal work time or only the total personal life time and total sleep time are calculated excluding the total work time.

For example, when a goal work time of the current day is 10 hours, a goal personal life time is 7 hours and 30 minutes, and a goal sleep time is 6 hours and 30 minutes, the electronic device 400 (e.g., the processor 401) may analyze location information and time information of the electronic device 400 collected during the current day, and may obtain a total work time of 12 hours and 30 minutes, a total personal life time of 5 hours, and a total sleep time of 6 hours and 30 minutes. The electronic device 400 (e.g., the processor 401) may display comparison information of the total work time, total personal life time, and total sleep time with the goal times, as shown in the diagram at the top of FIG. 15B. The comparison information may display that the total work time exceeds the goal work time by 2 hours and 30 minutes (+2 hrs 30 minutes), the total personal life time is below the goal personal life time by 2 hours and 30 minutes (−2 hrs 30 minutes), and the total sleep time is identical to the goal sleep time, in the form of a graph, as shown in the diagram at the top of FIG. 15B. In this instance, the electronic device 400 (e.g., the processor 401) may determine that there is an imbalance between work and personal life for the current day since the total personal life time of the current day is less than the goal personal life time.

For example, when a goal work time of the current day is 10 hours, a goal personal life time is 7 hours and 30 minutes, and a goal sleep time is 6 hours and 30 minutes, the electronic device 400 (e.g., the processor 401) may analyze location information and time information of the electronic device 400 collected during the current day, and may obtain a total work time of 10 hours, a total personal life time of 7 hours and 30 minutes, and a total sleep time of 6 hours and 30 minutes. The electronic device 400 (e.g., the processor 401) may display comparison information of the total work time, total personal life time, and total sleep time with the goal times, as shown in the diagram at the bottom of FIG. 15B. The comparison information may display that the total work time is identical to the goal work time, the total personal life time is identical to the goal personal life time, and the total sleep time is identical to the goal sleep time, in the form of a graph, as shown in the diagram at the bottom of FIG. 15B. In this instance, the electronic device 400 (e.g., the processor 401) may determine that there is a balance between work and personal life for the current day since the total work time, total personal life time, and total sleep time of the current day are identical to the goal times.

For example, when a goal work time of the current day is 10 hours, a goal personal life time is 7 hours and 30 minutes, and a goal sleep time is 6 hours and 30 minutes, the electronic device 400 (e.g., the processor 401) may analyze location information and time information of the electronic device 400 collected during the current day, and may obtain a total work time of 17 hours, a total personal life time of 0 hours, and a total sleep time of 5 hours. The electronic device 400 (e.g., the processor 401) may display comparison information of the total work time, total personal life time, and total sleep time with the goal times, as shown in the diagram at the top of FIG. 15C. The comparison information may display that the total work time exceeds the goal work time by 7 hours (7 hrs), the total personal life time is below the goal personal life time by 7 hours and 30 minutes (−7 hrs 30 mins), and the total sleep time is below the goal sleep time by 1 hour and 30 minutes (−1 hrs 30 mins), in the form of a graph, as shown in the diagram at the top of FIG. 15C. In this instance, the electronic device 400 (e.g., the processor 401) may determine that a user worked at the office for the current day without going home, since no total personal life time of is not calculated for the current day.

For example, when a goal work time of the current day is 10 hours, a goal personal life time is 7 hours and 30 minutes, and a goal sleep time is 6 hours and 30 minutes, the electronic device 400 (e.g., the processor 401) may analyze location information and time information of the electronic device 400 collected during the current day, and may obtain a total work time of 12 hours, a total personal life time of 8 hours, and a total sleep time of 5 hours. The electronic device 400 (e.g., the processor 401) may display comparison information of the total work time, total personal life time, and total sleep time with the goal times, as shown in the diagram at the bottom of FIG. 15C. The comparison information may display that the total work time exceeds the goal work time by 2 hours (+2 hrs), the total personal life time exceeds the goal personal life time by 30 minutes (+30 mins), and the total sleep time is below the goal sleep time by 1 hour and 30 minutes (−1 hrs 30 mins), in the form of a graph, as shown in the diagram at the bottom of FIG. 15C. In this instance, the electronic device 400 (e.g., the processor 401) may determine that the amount of sleep is insufficient for the current day since the total sleep time for the current day is less than the goal sleep time.

According to various embodiments, the electronic device 400 (e.g., the processor 401) may perform an operation of reporting the above determined information. For example, when it is determined that there is a balance between work and personal life for the current day, the electronic device 400 (e.g., the processor 401) may display text (or an image, multimedia, or the like) such as "You have a balance between work and personal life for the current day" on the touch sensitive screen 403, or may output a voice such as "You have a balance between work and personal life for the current day" through a speaker.

Figure 16A:
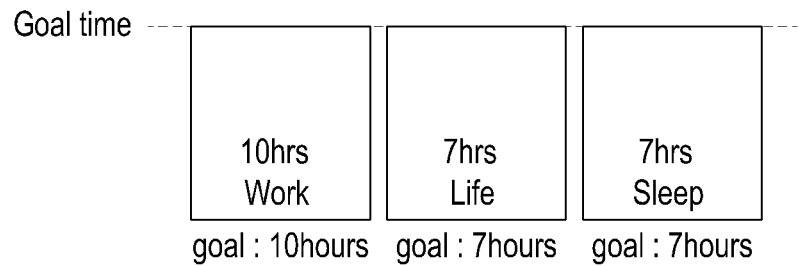
FIGS. 16A and 16B are diagrams illustrating examples of comparison information of a work time, a personal life time, and a sleep time with goal times according to various example embodiments.
Figure 16A:
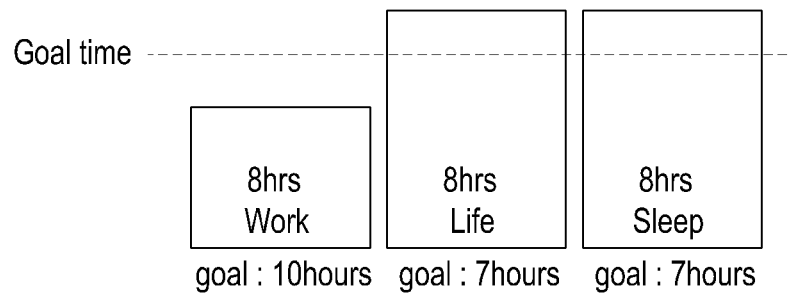
Figure 16A:
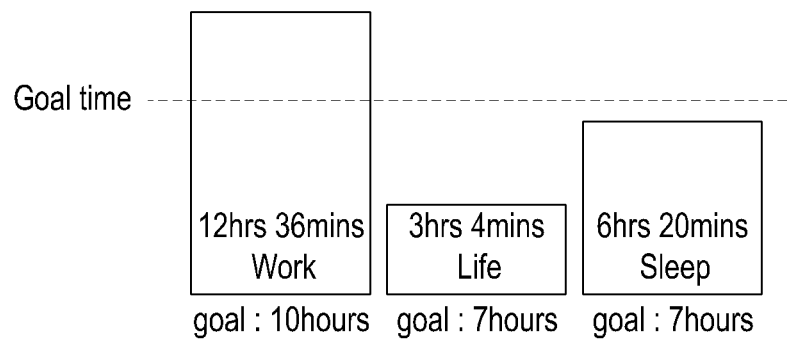
Figure 16B:
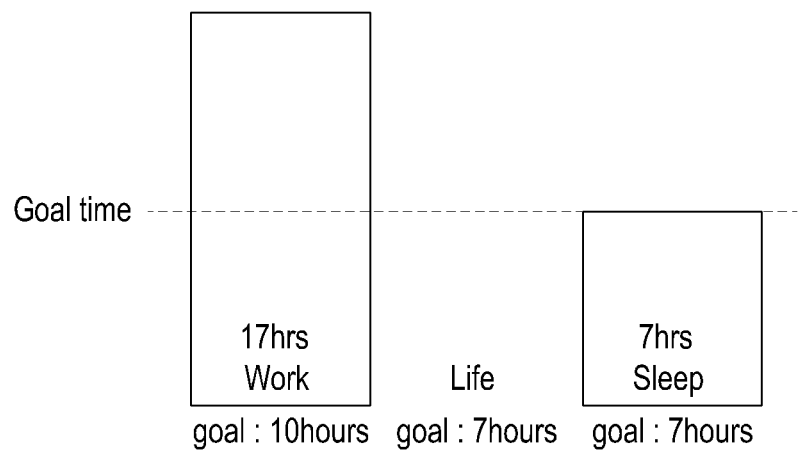
Figure 16B:
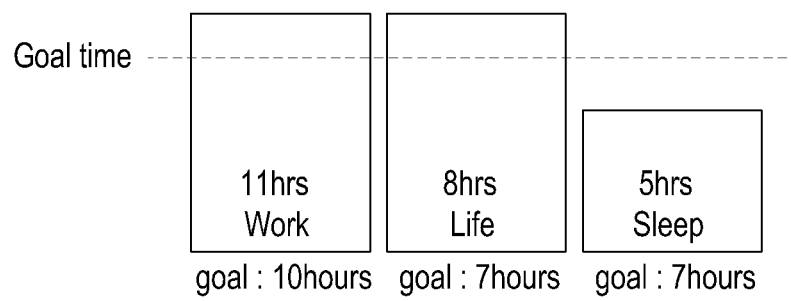

FIGS. 16A and 16B are diagrams illustrating examples of comparison information of a work time, a personal life time, and a sleep time with goal times according to various example embodiments.

According to an embodiment, the electronic device 400 (e.g., the processor 401) may obtain a work time, a personal life time, and a sleep time for a predetermined day, and may display comparison information between obtained times and goal times in the form of a graph and the like. Based on the comparison information, the electronic device 400 (e.g., the processor 401) may determine whether a user has a balance between work and personal life for the predetermined day.

For example, in the case in which a goal work time for the current day is 10 hours, a goal personal life time is 7 hours, and a goal sleep time is 7 hours, when an obtained work time is 10 hours, an obtained personal life time is 7 hours, and an obtained sleep time is 7 hours, the electronic device 400 (e.g., the processor 401) may display comparison information of the obtained work, personal life, and sleep times with the goal times, as shown in the diagram at the top of FIG. 16A. Since the obtained work time, personal life time, and sleep time are identical to the goal work time, goal personal life time, and goal sleep time, respectively, the electronic device 400 (e.g., the processor 401) may determine that a user has a balance between work and personal life for the current day.

For example, in the case in which a goal work time for the current day is 10 hours, a goal personal life time is 7 hours, and a goal sleep time is 7 hours, when an obtained work time is 8 hours, an obtained personal life time is 8 hours, and an obtained sleep time is 8 hours, the electronic device 400

(e.g., the processor 401) may display comparison information for the obtained work, personal life, and sleep times with the goal times, as shown in the diagram in the middle of FIG. 16A. Since the obtained work time is below the goal work time, the electronic device 400 (e.g., the processor 401) may determine that the amount of work done by a user is low for the current day.

For example, in the case in which a goal work time of the current day is 10 hours, a goal personal life time is 7 hours, and a goal sleep time is 7 hours, when an obtained work time is 12 hours and 36 minutes, an obtained personal life time is 3 hours and 4 minutes, and an obtained sleep time is 6 hours and 20 minutes, the electronic device 400 (e.g., the processor 401) may display comparison information of the obtained work, personal life, and sleep times with the goal times, as shown in the diagram at the bottom of FIG. 16A. Since the obtained personal life time is below the goal personal life time, the electronic device 400 (e.g., the processor 401) may determine that a user has an imbalance between work and personal life for the current day.

For example, in the case in which a goal work time of the current day is 10 hours, a goal personal life time is 7 hours, and a goal sleep time is 7 hours, when an obtained work time is 17 hours, a personal life time is not calculated, and an obtained sleep time is 7 hours, the electronic device 400 (e.g., the processor 401) may display comparison information of the obtained work, personal life, and sleep times with the goal times, as shown in the diagram at the top of FIG. 16B. In this instance, the electronic device 400 (e.g., the processor 401) may determine that a user worked at the office for the current day without going home, since no total personal life time is calculated for the current day.

For example, in the case in which a goal work time of the current day is 10 hours, a goal personal life time is 7 hours, and a goal sleep time is 7 hours, when an obtained work time is 11 hours, an obtained personal life time is 8 hours, and an obtained sleep time is 5 hours, the electronic device 400 (e.g., the processor 401) may display comparison information for the obtained work, personal life, and sleep times with the goal times, as shown in the diagram at the bottom of FIG. 16B. Since the obtained sleep time is below the goal sleep time, the electronic device 400 (e.g., the processor 401) may determine that the amount that a user slept on the current day is insufficient.

According to various embodiments, the present disclosure provides a user with an index indicating whether the user has a balanced life between work and personal life, thereby enabling the user to enhance the life with insight on his/her life.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, and without limitation, a dedicated processor, a CPU, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the present disclosure may include one or more of the aforementioned elements or may further include other additional elements, or some of the aforementioned elements may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

While the present disclosure has been described with reference to various example embodiments, it will be understood that these example embodiments are intended to be illustrative, and not limiting. Various changes, modifications and alternatives falling within the scope of the present disclosure will be apparent to those skilled in the art. Thus, it will be understood by those skilled in the art that various changes in form and details may be made without departing from the spirit and scope of the present disclosure as set forth in the appended claims and their equivalents.

What is claimed is:

1. An electronic device, comprising:
a display;
a processor; and
a memory,
wherein, the memory stores instructions, which when executed by the processor, are configured to cause the processor to perform operations including:
determining a first zone and a second zone different from the first zone, based on location information and time information of the electronic device;
obtaining a first time period during which the electronic device is located in the first zone and a second time period during which the electronic device is located in the second zone, for a day; and
displaying together first information associated with a comparison between a length of the first time period of the day and a length of a third goal time period set for the first zone and second information associated with a comparison between a length of the second time period of the day and a length of a fourth goal time period set for the second zone on the display,
wherein the first time period and the second time period do not overlap each other.

2. The electronic device of claim 1, wherein the instructions when executed by the processor cause the processor to perform operations including:
analyzing the location information and the time information;
determining places where the electronic device is located for a longest period of time within a designated time period; and
determining the determined places to be the first zone or the second zone.

3. The electronic device of claim 2, wherein the instructions when executed by the processor cause the processor to perform operations including:

determining a first place where the electronic device is located during a weekend or a holiday from among the determined places to be a first candidate zone; and
determining the first candidate zone to be the second zone based on analyzing electronic device usage information associated with the first candidate zone.

4. The electronic device of claim 2, wherein the instructions when executed by the processor cause the processor to perform operations including:
determining a second place from among the determined places to be a second candidate zone; and
determining the second candidate zone to be the first zone based on analyzing electronic device usage information associated with the second candidate zone.

5. The electronic device of claim 4, wherein the electronic device usage information includes a usage history of at least one function, program, or application associated with the electronic device.

6. The electronic device of claim 1, wherein the instructions when executed by the processor cause the processor to perform operations including:
obtaining a third time period taken for using the electronic device in the first zone for use not relevant to the first zone; and
excluding the obtained third time period from the first time period.

7. The electronic device of claim 6, wherein the first time period further includes a first duration time period taken for the electronic device to move from the second zone to the first zone, and a second duration time period taken for the electronic device to move from the first zone to the second zone.

8. The electronic device of claim 6, wherein the instructions when executed by the processor cause the processor to perform operations including:
obtaining a fourth time period taken for using the electronic device in the second zone for use not relevant to the second zone; and
excluding the obtained fourth time period from the second time period.

9. A method of operating an electronic device, the method comprising:
determining a first zone and a second zone different from the first zone, based on location information and time information of an electronic device;
obtaining a first time period during which the electronic device is located in the first zone and a second time period during which the electronic device is located in the second zone for a day; and
displaying together first information associated with a comparison between a length of the first time period of the day and a length of a third goal time period set for the first zone and second information associated with a comparison between a length of the second time period of the day and a length of a fourth goal time period set for the second zone on a display of the electronic device,
wherein the first period and the second time period do not overlap each other.

10. The method of claim 9, wherein the displaying the information associated with the first time period and second information associated with the second time period on the display comprises:
displaying comparison information between the first time period and the second time period on the display.

11. The method of claim 9, wherein the determining the first zone and the second zone comprises:
determining places where the electronic device is located for a longest period of time within a designated time period based on analyzing the location information and time information; and
determining the determined places to be the first zone and the second zone.

12. The method of claim 11, wherein the determining the first zone comprises:
determining a first place where the electronic device is located on a weekend or a holiday from among the determined places, to be a first candidate zone; and
determining the first candidate zone to be the second zone based on analyzing electronic device usage information associated with the first candidate zone.

13. The method of claim 11, wherein the determining the second zone comprises:
determining a second place from among the determined places to be a second candidate zone; and
determining the second candidate zone to be the first zone based on analyzing electronic device usage information associated with the second candidate zone.

14. The method of claim 13, wherein the electronic device usage information includes a usage history of at least one function, program, or application associated with the electronic device.

15. The method of claim 9, further comprising:
obtaining a third time period taken for using the electronic device in the first zone for use not relevant to the first zone; and
excluding the obtained third time period from the first time period.

16. The method of claim 15, wherein the first time period further comprises a first duration time period taken for the electronic device to move from the second zone to the first zone, and a second duration time period taken for the electronic device to move from the first zone to the second zone.

17. The method of claim 15, further comprising:
obtaining a fourth time period taken for using the electronic device in the second zone for use not relevant to the second zone; and
excluding the obtained fourth time period from the second time period.

18. A non-transitory storage medium storing instructions, wherein the instructions are configured to enable at least one processor to perform at least one operation when the instructions are executed by the at least one processor, the at least one operation comprising:
determining a first zone and a second zone different from the first zone, based on location information and time information of an electronic device;
obtaining a first time period during which the electronic device is located in the first zone and a second time period during which the electronic device is located in the second zone, for the day;
displaying together first information associated with a comparison between a length of the first time period of the day and a length of a third goal time period set for the first zone and second information associated with a comparison between a length of the second time period of the day and a length of a fourth goal time period set for the second zone on a display of the electronic device,
wherein the first time period and the second time period do not overlap each other.

* * * * *